(12) United States Patent
Mitzev et al.

(10) Patent No.: US 9,683,350 B1
(45) Date of Patent: Jun. 20, 2017

(54) FREEZE PROTECTION FOR PIPES

(71) Applicants: Ognian Simeonov Mitzev, San Ramon, CA (US); Raymond Edward Blessing, Maynard, MA (US)

(72) Inventors: Ognian Simeonov Mitzev, San Ramon, CA (US); Raymond Edward Blessing, Maynard, MA (US)

( * ) Notice: Subject to any disclaimer, the term of this patent is extended or adjusted under 35 U.S.C. 154(b) by 0 days.

(21) Appl. No.: 15/040,557

(22) Filed: Feb. 10, 2016

Related U.S. Application Data

(60) Provisional application No. 62/114,128, filed on Feb. 10, 2015.

(51) Int. Cl.
 *E03B 7/10* (2006.01)
 *E03B 7/12* (2006.01)
 *F16L 55/07* (2006.01)
 *F16L 55/10* (2006.01)

(52) U.S. Cl.
 CPC ............. *E03B 7/12* (2013.01); *F16L 55/07* (2013.01); *F16L 55/1022* (2013.01)

(58) Field of Classification Search
 CPC ....... E03B 7/10; E03B 7/712; Y10T 137/1298
 USPC .......... 137/61, 630.15; 236/99 R, 100, 99 C, 236/99 F; 251/129.01
 See application file for complete search history.

(56) References Cited

U.S. PATENT DOCUMENTS

| | | | | |
|---|---|---|---|---|
| 746,115 A * | 12/1903 | Lindsay | .................... | E03B 7/10 137/61 |
| 1,526,718 A * | 2/1925 | Opp | .......................... | E03B 7/12 137/13 |
| 1,849,491 A * | 3/1932 | Kelley | ................. | G05D 23/125 137/61 |
| 4,360,036 A * | 11/1982 | Shelton | ..................... | E03B 7/12 137/107 |
| 4,361,167 A * | 11/1982 | Harasewych | ............ | F01P 11/20 137/62 |
| 5,113,892 A * | 5/1992 | Hull | ......................... | E03B 7/10 137/238 |
| 5,226,454 A * | 7/1993 | Cabalfin | ............... | F16K 31/045 137/870 |
| 5,694,963 A * | 12/1997 | Fredell | ..................... | E03B 7/12 137/2 |
| 6,374,848 B1 * | 4/2002 | McGhee | .................. | E03B 7/08 137/62 |

(Continued)

*Primary Examiner* — Reinaldo Sanchez-Medina
(74) *Attorney, Agent, or Firm* — Brown Rudnick LLP; Weber Hsiao

(57) ABSTRACT

Examples of a protection valve and a system of protection valves are provided to meet the water needs of a building, while reducing the risk of pipe bursting caused by water freezing in a domestic water system. In response to freezing temperatures, the protection valve/system actuates from run mode to protection mode. In protection mode, the protection valve/system inhibits water from flowing into the domestic water system and also drains water from it. Advantageously, draining the water reduces the likelihood of ice forming in the domestic water system. Even if ice did form, the protection valve/system opens the domestic water system to a drain, reducing the likelihood that water pressure can build up high enough to cause a rupture. Even if there is a rupture, the protection valve/system in protection mode inhibits water from flowing into the domestic water system and out through the rupture.

19 Claims, 16 Drawing Sheets

(56) References Cited

U.S. PATENT DOCUMENTS

| | | | | |
|---|---|---|---|---|
| 2003/0192600 A1* | 10/2003 | Ford | ...................... | E03B 7/071 137/624.12 |
| 2011/0248199 A1* | 10/2011 | Konovalski | ............... | E03B 7/08 251/129.15 |
| 2014/0001383 A1* | 1/2014 | Staffiere | ................ | F16K 31/055 251/129.01 |

* cited by examiner

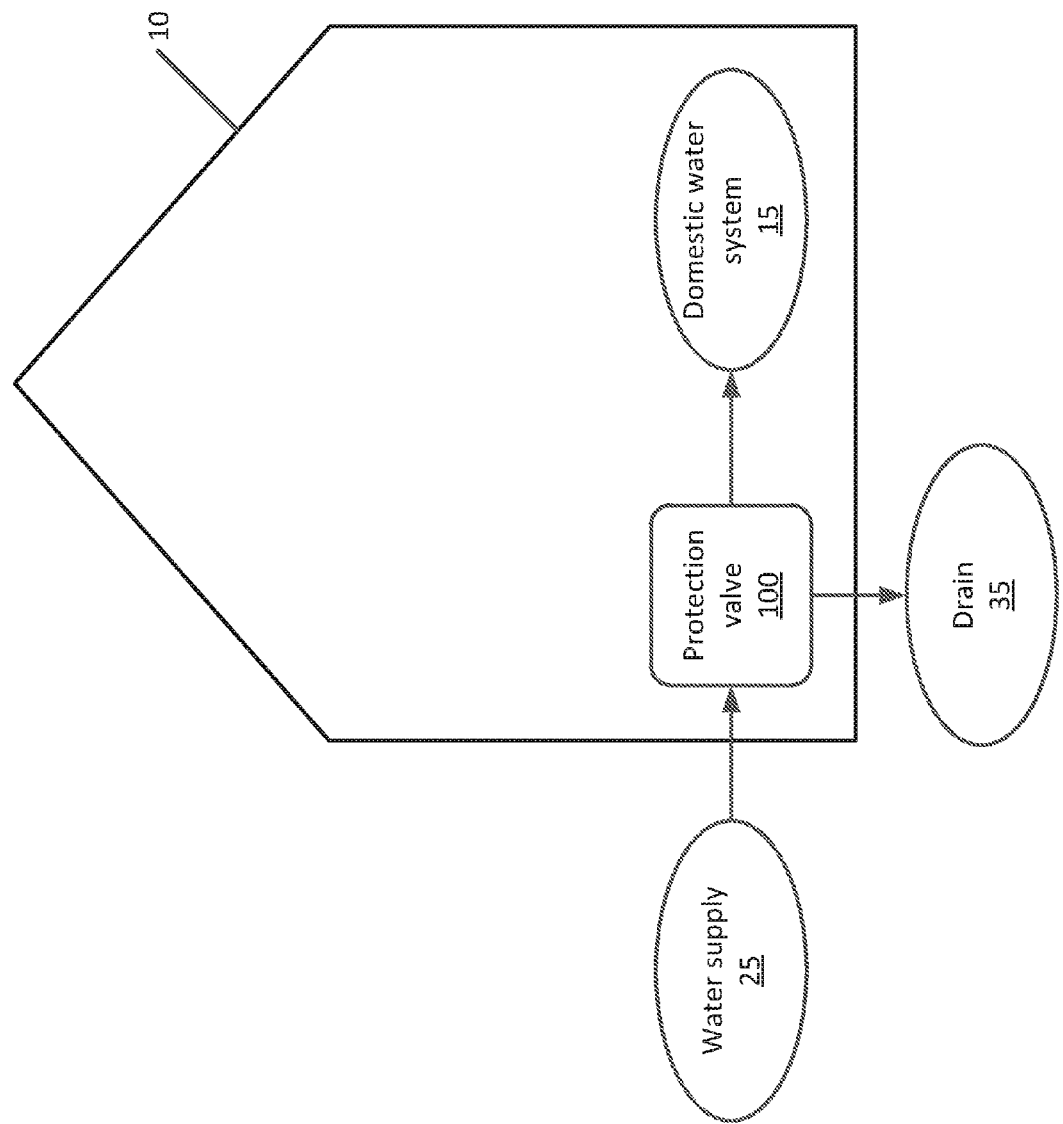

FREEZE PROTECTION FOR PIPES

CROSS-REFERENCE TO RELATED APPLICATION(S)

This application claims the benefit of U.S. Provisional Application No. 62/114,128, filed on Feb. 10, 2015. The entire teachings of the above application(s) are incorporated herein by reference.

BACKGROUND

When water freezes, it expands. When water freezes in a pipe, the pipe can rupture allowing water to escape causing serious property damage. The annual water-related damage loss due to ruptured pipes in the U.S. is estimated at $3.5 billion. Some insurers report that water damage due to frozen pipes represents the single largest source of insurance claims. Surprisingly, a pipe does not a break where the ice forms. It is not the radial expansion of ice against the wall of the pipe that causes the pipe to burst. Rather, following a complete ice blockage in the pipe, continued freezing and expansion inside the pipe causes water pressure to increase downstream—for example, between the ice blockage and a closed faucet at the end of the pipe. When this happens, the water pressure may rise from approximately 35 pounds per square inch (psi) to over 4,000 psi. The vast increase in water pressure leads to pipe failure. What is needed is a solution that reduces the possibility of such a scenario. It is also desirable for the solution to be automatic requiring little or no human intervention. It is also desirable for the solution to be able to run off of a battery or other low voltage power sources.

SUMMARY

An example of a main protection valve includes a valve body and a controller. The valve body includes a water supply inlet adapted to couple to a water supply, a water supply outlet adapted to couple to a domestic water system, and a drain outlet adapted to couple to a drain. The main protection valve controller is configured to actuate the main protection valve between run mode and protection mode. In run mode, the water supply inlet and the water supply outlet are opened, and the drain outlet is closed. In protection mode, the water supply inlet is closed, and the water supply outlet and the drain outlet are opened. In response to a first signal, the main protection valve controller actuates the main protection valve from the run mode to protection mode thereby inhibiting water from flowing from the water supply into the domestic water system. Water from the domestic water system is also emptied into the drain.

In some examples of the main protection valve, the main protection valve controller is further configured to, in response to a second signal, actuate the main protection valve from protection mode to the run mode allowing water to flow into the domestic water system and stop water in the domestic water system from flowing into the drain.

In other examples of the main protection valve, given the first signal is representative of a temperature, the main protection valve controller is further configured to compare the temperature to a threshold, and based on the comparison, actuate the main protection valve from the run mode to protection mode.

Some examples of the main protection valve controller include a temperature sensor integrated with the main protection valve controller. Other examples of the main protection valve controller are communicatively coupled to a temperature sensor located external to the main protection valve controller.

In some examples of the main protection valve, the main protection valve controller is electrically coupled to an electrical power source. The electrical power source can be a battery, an energy harvester, and a combination including a battery and energy harvester. In some further examples, the electrical power source is a telephone network and the main protection valve controller is electrically coupled to the telephone network by a telephone line. The main protection valve controller draws power from the telephone network. Advantageously, some examples of the main protection valve are purposely designed to function in the case of a power outage and heat source failure.

In other examples of the main protection valve, the main protection valve controller is communicatively coupled to a wireless network and communicates the status of the main protection valve over the wireless network.

In some examples of the main protection valve, the main protection valve controller is communicatively coupled to and controlled by a thermostat. In further examples, the main protection valve controller is communicatively coupled to and controlled by a smart home gateway.

In other examples of the main protection valve, the main protection valve controller is communicatively coupled to a telephone line and provides the status of the main protection valve over the telephone line. In a further example, the telephone line communicatively couples the main protection valve controller to a cellular phone or to a satellite phone. The main protection valve controller provides the status of the main protection valve over a cellular connection or a satellite connection.

In some examples of the main protection valve, the main protection valve controller is communicatively coupled to a water meter. The signal to actuate the main protection valve from run mode to the protection is based on a rate of water flow measured by the water meter over a period of time.

In other examples of the main protection valve, the main protection valve controller is communicatively coupled to a user device. The signal to actuate the main protection valve from run mode to protection mode is a manual signal from the user device.

In some examples of the main protection valve, the main protection valve controller is further configured to actuate the main protection valve periodically thereby allowing debris built up inside the main protection valve to escape.

In other examples of the main protection valve, the main protection valve controller is further configured to open the water supply inlet incrementally over a period of time.

An example system of protection valves includes the main protection valve and a heating system drain valve. The heating system drain valve includes a valve body and a heating system drain valve controller. The valve body includes an inlet adapted to couple to a heating system and an outlet adapted to couple to the drain. The heating system drain valve controller is configured to actuate the heating system drain valve between run mode and protection mode. In run mode, the inlet and outlet are closed. In protection mode, the inlet and outlet are opened. In response to the first signal, the main protection valve sends a protect signal to the heating system drain valve controller. In response to the protect signal, the heating system drain valve controller actuates the heating system drain valve from run mode to protection mode thereby emptying water from the heating system into the drain.

Another example of a system of protection valves includes a protection valve and a drain valve. The protection valve includes a valve body and a protection valve controller. The valve body includes a water supply inlet adapted to couple to a water supply and a water supply outlet adapted to couple to a domestic water system or heating system. The protection valve controller is configured to actuate the protection valve between run mode and protection mode. In run mode, the water supply inlet and water supply outlet are opened. In protection mode, the water supply inlet and water supply outlet are closed. The drain valve includes a valve body and a drain valve controller. The valve body includes an inlet adapted to couple to the domestic water system and/or heating system and an outlet adapted to couple to the drain. The drain valve controller is configured to actuate the protection valve between run mode and protection mode. In run mode, the drain valve inlet and outlet are closed. In protection mode, the drain valve inlet and outlet are opened. In response to a first signal, the protection valve controller actuates the protection valve from run mode to protection mode thereby inhibiting water from flowing into the domestic water system and/or heating system. The protection valve controller also sends a second signal to the drain valve. In response to the second signal, the drain valve controller actuates the protection valve from run mode to protection mode thereby emptying water from the domestic water system or heating system into the drain.

In other examples of system, given the first signal is representative of a temperature, the protection valve controller is further configured to compare the temperature to a threshold, and based on the comparison, actuate the protection valve from run mode to protection mode.

Some examples of the main protection valve controller include a temperature sensor integrated with the main protection valve controller. Other examples of the main protection valve controller are communicatively coupled to a temperature sensor located external to main protection valve controller.

In other examples of system, the protection valve controller is further configured to, in response to a third signal, actuate the protection valve from protection mode to run mode allowing water to flow into the domestic water system and/or heating system. In a further example, given the third signal is representative a temperature reading, protection valve controller is further configured to compare the temperature to a threshold, and based on the comparison, actuate the protection valve from protection mode to run mode allowing water to flow into the domestic water system and/or heating system.

In some examples of system, the drain valve controller is further configured to, upon expiration of a period of time, actuate the drain valve from protection mode to run mode.

In other examples of system, the protection valve controller is communicatively coupled to a user device. The signal to actuate the protection valve from run mode to protection mode is a manual signal from the user device.

In another example of system, the protection valve controller and the drain valve controller are wirelessly communicatively coupled.

An example of a heating system protection valve includes a valve body and a heating system protection valve controller. The valve body includes a water supply inlet adapted to couple to a heating system and a drain outlet adapted to couple to a drain. The heating system protection valve controller is configured to actuate the heating system protection valve between run mode and protection mode. In run mode, the water supply inlet and the drain outlet are closed. In protection mode, the water supply inlet and the drain outlet are opened. In response to a first signal, the heating system protection valve controller actuates the heating system protection valve from run mode to protection mode emptying water from the heating system into the drain.

An example method includes providing a main protection valve. The main protection valve includes a valve body and a controller. The valve body includes a water supply inlet adapted to couple to a water supply, a water supply outlet adapted to couple to a domestic water system, and a drain outlet adapted to couple to a drain. The main protection valve controller is configured to actuate the main protection valve between run mode and protection mode. In run mode, the water supply inlet and the water supply outlet are opened, and the drain outlet is closed. In protection mode, the water supply inlet is closed, and the water supply outlet and the drain outlet are opened. The method further includes, in response to a first signal, closing the water supply inlet thereby inhibiting water from flowing from the water supply into the domestic water system. The method further includes, opening the water supply outlet and the drain outlet thereby emptying water from the domestic water system into the drain.

Another example method includes providing a system of protection valves including a protection valve and a drain valve. The protection valve includes a valve body and a protection valve controller. The valve body includes a water supply inlet adapted to couple to a water supply and a water supply outlet adapted to couple to a domestic water system or heating system. The protection valve controller is configured to actuate the protection valve between run mode and protection mode. In run mode, the water supply inlet and water supply outlet are opened. In protection mode, the water supply inlet and water supply outlet are closed. The drain valve includes a valve body and a drain valve controller. The valve body includes an inlet adapted to couple to the domestic water system and/or heating system and an outlet adapted to couple to the drain. The drain valve controller is configured to actuate the protection valve between run mode and protection mode. In run mode, the drain valve inlet and outlet are closed. In protection mode, the drain valve inlet and outlet are opened. The method further includes, in response to a first signal, closing the water supply inlet thereby inhibiting water from flowing from the water supply into the domestic water system and/or heating system. The method further includes sending a second signal to the drain valve. The method further includes, in response to the second signal, opening the outlet thereby emptying water from the domestic water system or heating system into the drain.

BRIEF DESCRIPTION OF THE DRAWINGS

The foregoing and other objects, features and advantages will be apparent from the following more particular description of the examples, as illustrated in the accompanying drawings in which like reference characters refer to the same parts throughout the different views. The drawings are not necessarily to scale; emphasis instead is placed on illustrating the principles of the examples.

FIG. 2A is a diagram of a building with a protection valve for protecting the domestic water system from damage caused by water freezing in the domestic water system.

DETAILED DESCRIPTION

Figure 1:
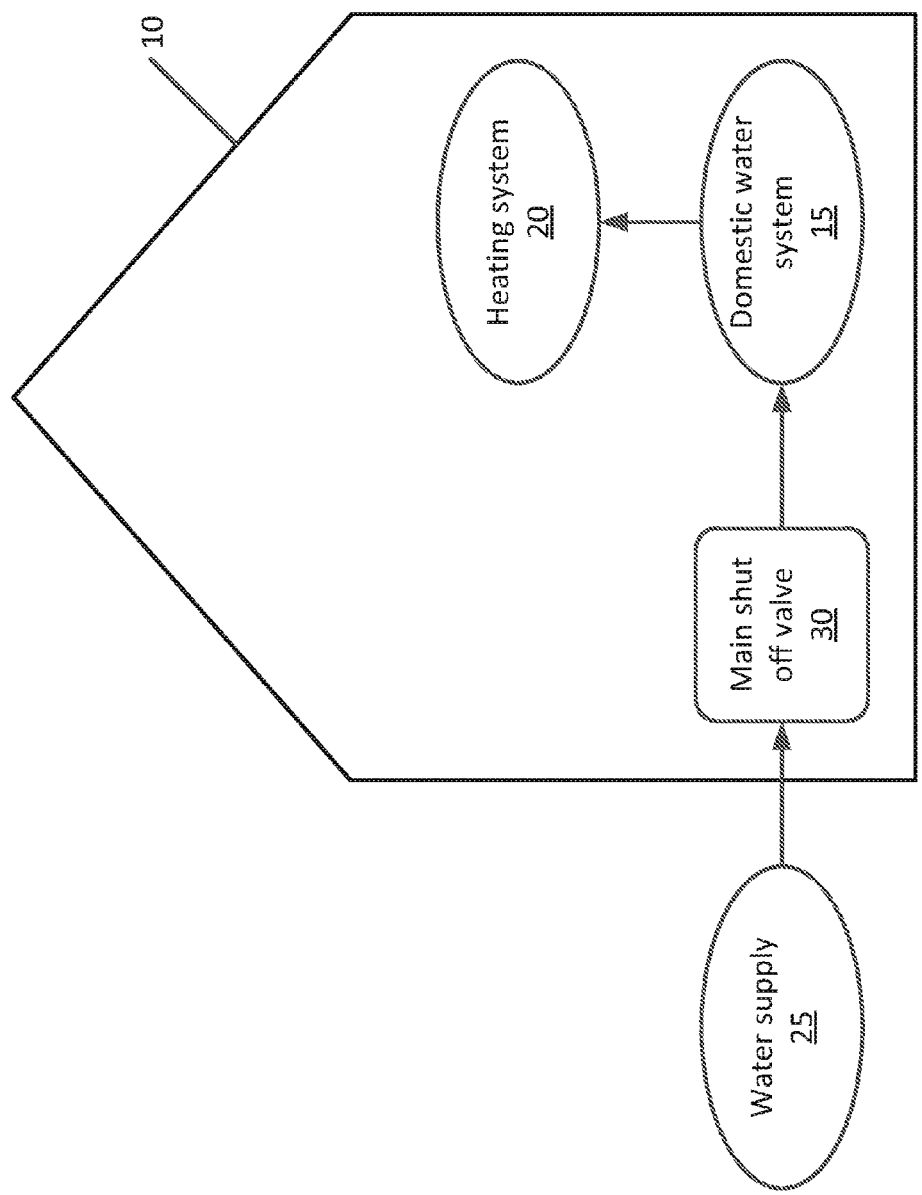
FIG. 1 is a diagram of a building with a typical main valve for controlling water flow from a water supply to a domestic water system and heating system, as is known the art.

FIG. 1 shows a typical building 10, such as a house, with a domestic water system 15 and a heating system 20. The domestic water system 15 provides residents with the water needed to wash their hands, take showers, use the toilet, etc. The domestic water system 15 includes, for example, indoor and outdoor faucets, toilets, shower heads, domestic hot water tank, etc. and an assembly of pipes supplying water to these plumbing fixtures (not shown in FIG. 1). The heating system 20 provides thermostatically controlled heat to rooms within the building. The heating system 20 includes a heat source (e.g., a furnace or boiler) and an assembly of pipes supplying heated water to radiators throughout the building 10 (not shown in FIG. 1). The radiators transfer heat from the forced hot water system to the ambient air heating the room primarily by way of convection.

A water supply 25 provides water to the domestic water system 15 and the heating system 20 to meet the water and heating needs of the building 10. Examples of the water supply 25 include city water and a private well (which is typically connected to a tank that stores and pressurizes the water pumped from the well).

The domestic water system 15 and the heating system 20 are typically interconnected by a one-way valve (e.g., check valve or backflow preventer valve). The one-way valve allows the domestic water system 15 to fill the heating system 20 with water but prevents the water from the heating system 20 from flowing back into the domestic water system 15. Examples of the one-way valve include an automatic pressure-reducing water feeder valve.

Under proper conditions, the heating system 20 does not normally consume any water. Once the heating system 20 is filled with water, that same water remains in the heating system 20 indefinitely. The water is heated and circulated through the occupied space to provide heat to the building. Water may be lost from a heating system 20, however, due to a small leak that may be un-noticed, or water may be removed from the heating system 20 during servicing.

The automatic pressure-reducing water feeder valve used in the heating system 20 performs two functions. The first function is reduce the incoming water pressure from the water supply 25 down to a pressure of the heating system 20 when cold (e.g., reduce, for example, from 35 psi to 12 psi). The second function is to add water, called "makeup water," to the heating system 20 when needed to keep the heating system 20 full of water. If water pressure in the heating system 20 drops below the pressure of the heating system 20 when cold, then the water feeder valve adds makeup water to the system automatically, until it reaches the preset pressure or field adjusted pressure.

FIG. 1 further shows a typical main shut off valve 30 located between the domestic water system 15 and the water supply 25, as is known in the art. The main shut off valve 30 controls the flow of water from the water supply 25 into the domestic water system 15 that, in turn, supplies the flow of water into the heating system 20. Opening the main shut off valve 30 allows water to flow from water supply 25 into the domestic water system 15 and, when required, supplies water to the heating system 20. Shutting off the main shut off valve 30 stops water from flowing into the domestic water system 15 and the heating system 20.

When an ice blockage forms and causes a rupture in the domestic water system 15 and/or heating system 20, water from the main water supply 25 can flow into the domestic water system 15 and/or heating system 20 and out through the rupture and flood the building 10. An ⅛ inch crack in a pipe can release up to 250 gallons of water per day. Water damage is the second most common insurance claim having the fourth highest cost and is responsible for increasing homeowner insurance premiums. Closing the main shut off valve 30 prevents water from flowing into the domestic water system 15 and the heating system 20. Water already present in the domestic water system 15 and the heating system 20, however, can flow out through the rupture and still flood the building 10.

Adding the ability to sense when the temperature is freezing and shutting off the water, automatically, is help but is not a complete solution needed to mitigate water damage from freezing for either domestic water system 15 and the heating system 20. Water still remains in the domestic water system 15 and the heating system 20, and can still freeze causing a rupture and flooding in the building 10. In this way, merely closing the main shut off valve 30, even automatically, is an incomplete solution to preventing damage from frozen pipes.

FIG. 2A shows a protection valve 100 that may be used in the building 10, such as a house, to meet the water needs of its residents, while reducing the risk of pipe breakage caused by water freezing. The protection valve 100 connects the domestic water system 15 to the water supply 25. The protection valve 100 is further connected to a drain 35.

Examples of the drain 35 include city sewage and an overflow container with sufficient volume to contain the amount of water in the domestic water system 15. Another example of the drain 35 is a hose, again with sufficient volume to contain the amount of water in the domestic water system 15. In some applications, the drain 35 may be the ground or basement floor of the building 10.

The protection valve 100 operates in two modes—run mode and protection mode. In run mode, the protection valve 100 allows water to flow from the water supply 25 into the domestic water system 15, and stops water from flowing out of the domestic water system 15 into the drain 35. In protection mode, the protection valve 100 stops water from the water supply 25 from flowing into the domestic water system 15, and empties water from the domestic water system 15 into the drain 35.

When the temperature in the building 10 or in part of the building 10 approaches or reaches freezing, for example, the protection valve 100 changes from run mode to protection mode. The protection valve 100 stops water from flowing into the domestic water system 15 and empties water from the domestic water system 15 into the drain 35, reducing the likelihood that an ice blockage can form in the domestic water system 15. Even if there is an ice blockage in the domestic water system 15, the protection valve 100 opens the domestic water system 15 to the drain 35, reducing the likelihood that water pressure can build up high enough to cause a rupture. Even if there is a rupture in the domestic water system 15, the protection valve 100 stops water from flowing from the water supply 25, into the domestic water system 15, and out through the rupture.

Figure 2B:
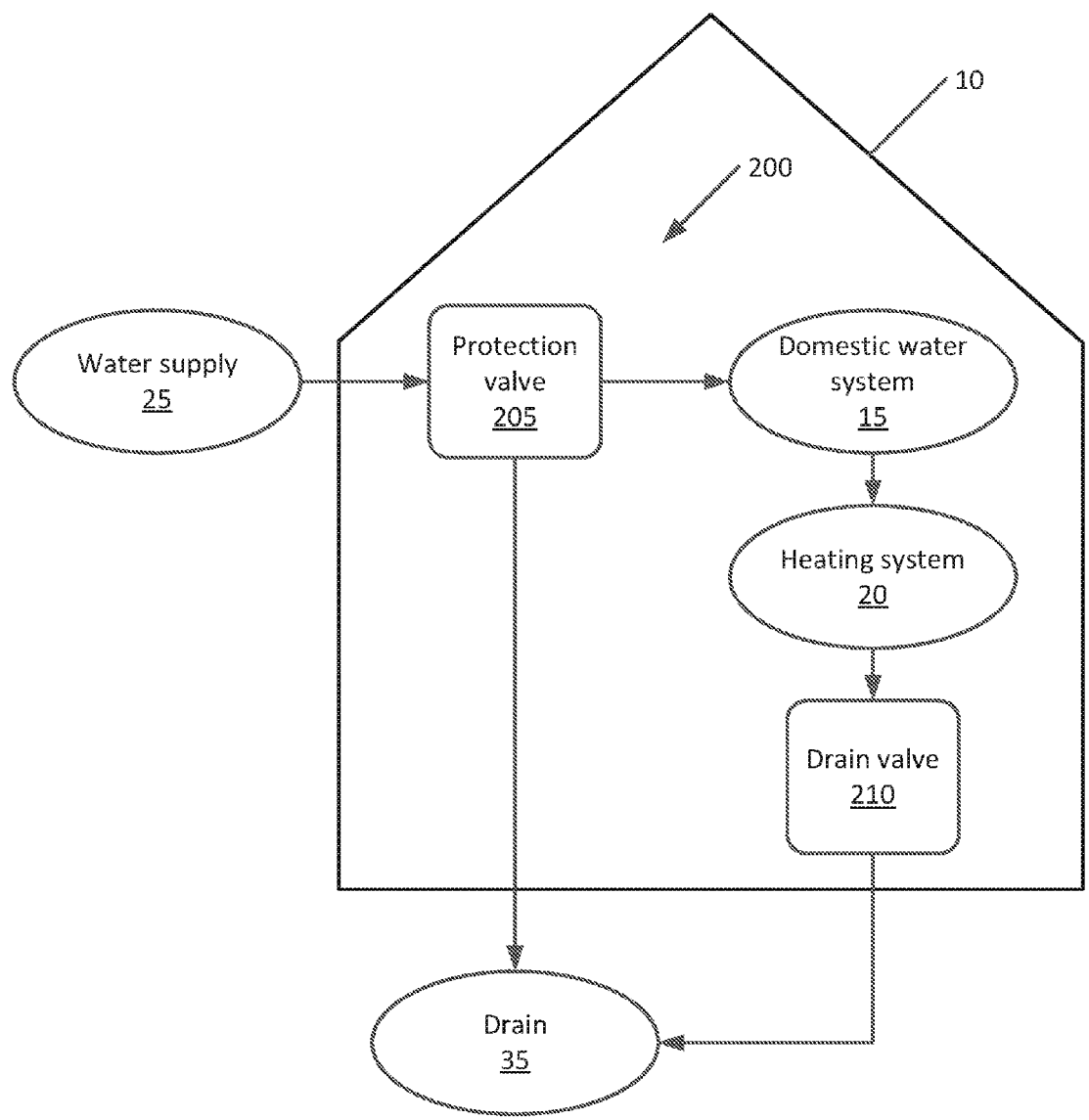
FIG. 2B is a diagram of a building with a system of protection valves for protecting the domestic water system and the heating system from damage caused by water freezing in the domestic water system and/or heating system.

FIG. 2B shows a system of protection valves 200 that may be used in the building 10 to meet the water and heating needs of its residents, while reducing the risk of pipe breakage caused by water freezing. The system includes a protection valve 205 and a drain valve 210. The drain valve 210 connects the heating system 20 to the drain 35.

The system 200 operates in two modes—run mode and protection mode. In run mode, the system 200 allows, by way of the protection valve 205, water to flow from the water supply 25 into the domestic water system 15; and stops water from flowing out of the domestic water system 15 into the drain 35. As discussed above with reference to FIG. 1, the domestic water system 15 and heating system 20 are interconnected by a one-way valve that prevents water from the heating system 20 from emptying through the domestic water system 15. The system 200 further stops, by way of the drain valve 210, water from the heating system 20 from emptying into the drain 35. In protection mode, the system 200 stops, by way of the protection valve 205, water from the water supply 25 from flowing into the domestic water system 15 and, in turn, into the heating system 20; and empties water from the domestic water 15 system into the drain 35. The system 200 further empties, by way of the drain valve 210, water from the heating system 20 into the drain 35.

When the temperature in the building 10 or in part of the building 10 approaches or reaches freezing, for example, the system 200 changes from run mode to protection mode. The protection valve 205 stops water from flowing into the domestic water system 15 and empties water from the domestic water system 15 into the drain 35, reducing the likelihood that an ice blockage can form in the domestic water system 15. The drain valve 210 empties water from the heating system 20 into the drain 35, reducing the likelihood that an ice blockage can form in the heating system 20. Even if there is an ice blockage in the domestic water system 15 and/or heating system 20, the protection valve 205 and the drain valve 210 open the domestic water system 15 and the heating system 20, respectively, to the drain 35, reducing the likelihood that water pressure can build up high enough to cause a rupture. Even if there is rupture in the domestic water system 15 and/or heating system 20, the protection valve 205 stops water from flowing from the water supply 25, into the domestic water system 15 and the heating system 20, and out through the rupture. It's worth noting that a 100 foot run of ¾ inch copper pipe contains just 2.3 gallons of water; for domestic use, ½ inch copper pipe is used: the same 100 foot pipe would contain just 1 gallon of water.

Figure 2C:
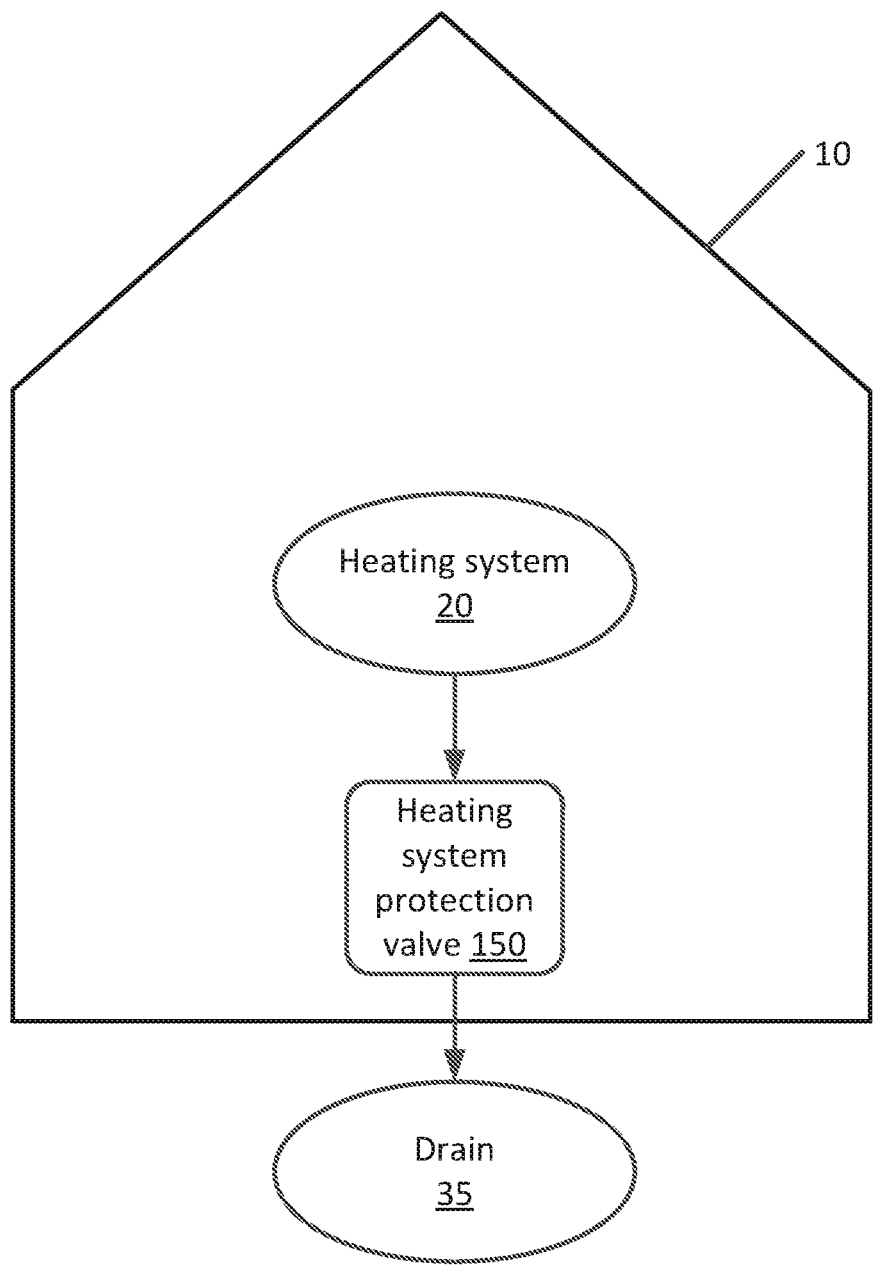
FIG. 2C is a diagram of a building with a heating system protection valve for protecting the heating system from damage caused by water freezing within the heating system.

FIG. 2C shows a heating system protection valve 150 for protecting a heating system from damage caused by water freezing in the heating system. The heating system protection valve 150 connects the heating system 20 to the drain 35. Some examples of the heating system 20 have a hose bib used to drain the heating system 20 of water. Typically, the heating system 20 needs to be drained of water before work or repairs can be done on the heating system 20 and its components, e.g., a hot water heater or boiler. The hose bib has male threads at one end for attaching a garden hose, which is useful when draining the heating system 20 of water.

A convenient example of the heating system protection valve 150 includes female hose threads. The heating system protection valve 150 is installed by simply threading it onto the hose bib of the heating system 20. Advantageously, the heating system protection valve 150 can be installed with just a wrench (or even hand-tightened) making the heating system protection valve 150 easy, quick, and inexpensive to install. Some examples of the heating system protection valve 150 can be soldered in the case of copper pipes or "cemented" in the case of polyvinyl chloride (PVC) pipes.

The heating system protection valve 150 operates in two modes—run mode and protection mode. In run mode, the heating system protection valve 150 stops water from the heating system 20 from emptying into the drain 35. In protection mode, the heating system protection valve 150 allows water to flow out of the heating system 20 into the drain 35.

When the temperature in the building 10 or in part of the building 10 approaches or reaches freezing, for example, the heating system protection valve 150 changes from run mode to protection mode. The heating system protection valve 150 empties water from the heating system 20 into the drain 35, reducing the likelihood that an ice blockage can form in the heating system 20. Even if there is an ice blockage in the heating system 20, the heating system protection valve 150 opens the heating system 20 to the drain 35, reducing the likelihood that water pressure can build up high enough to cause a rupture.

While described above as protecting against damage caused by ice forming, the protection valve 100, the heating system protection valve 150, the system of protection valves 200 and their examples can be used to protect against other conditions that can threaten the domestic water system 15 and heating system 20. Some examples of the protection valve can protect the water system 15 and heating system 20 when there is an electrical power failure. A typical heating system needs electricity to run, for example, to operate a circulator pump, blower, etc. Without electricity, the heating system 20 cannot heat the building 10 and the temperature inside can drop to or below freezing. Some examples of the protection valve sense the loss of electricity and switch from run mode to protection mode using a battery or other low voltage power source, as described below in greater detail.

Figure 3:
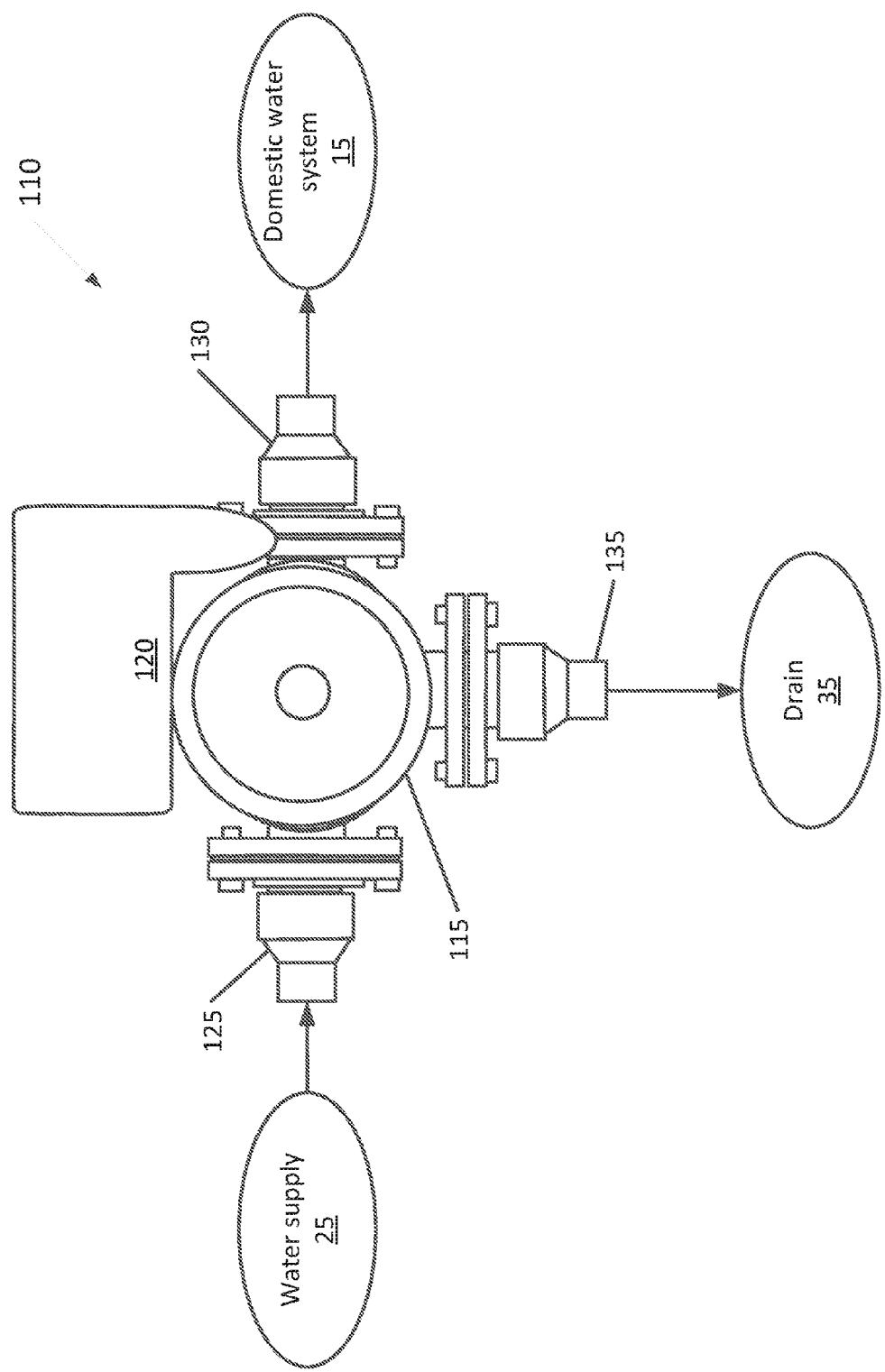
FIG. 3 is a diagram of an example of the protection valve.

FIG. 3 shows an example protection valve called a main protection valve 110. The main protection valve 110 includes a valve body 115 and a main protection valve controller 120. The valve body 115 includes a water supply inlet 125, a water supply outlet 130, and a drain outlet 135. The water supply inlet 125 connects the main protection valve 110 to the water supply 25. The water supply outlet 130 connects the main protection valve 110 to the domestic water system 15. The drain outlet 135 connects the main protection valve 110 to the drain 35.

In a convenient example of the main protection valve 110, the valve body 115 is made from brass or other suitable metals that are lead-free compliant or have a maximum weighted-average of 0.25% lead content. By way of non-limiting examples, the water supply inlet 125, the water supply outlet 130, and the drain outlet 135 can include threads (e.g., female National Pipe Thread or NPT), a sweat connection, a compression coupling, a slide coupling (e.g., SHARKBITE), or any combination thereof. For example, the water supply inlet 125 and the water supply outlet 130 include sweat connections while the drain outlet 135 is threaded. Solder-less examples of the main protection valve 110 are particularly advantageous because they are easy and quick to install without requiring specialized skills and tools; making them attractive to the "do-it-yourselfers" and professional alike. The water supply inlet 125, the water supply outlet 130, and the drain outlet 135 can be any one of a number of different sizes suitable for making their respective connections, e.g., ¾ inch, 1 inch, and 1¼ inch. One skilled in the art will readily recognize that this and other examples of the protection valve are not limited to a certain type of connection and/or size.

The valve body 115 further includes an electric motor (not shown) that drives an advance mechanism (not shown) through a gear train (not shown) to switch the main protection valve 110 between run mode and protection mode. Examples of the advance mechanism include a cam or central spindle. Energizing the electric motor actuates the advance mechanism (e.g., rotates) which, in turn, opens and/or closes the water supply inlet 125, the water supply outlet 130, and the drain outlet 135.

Figure 4:
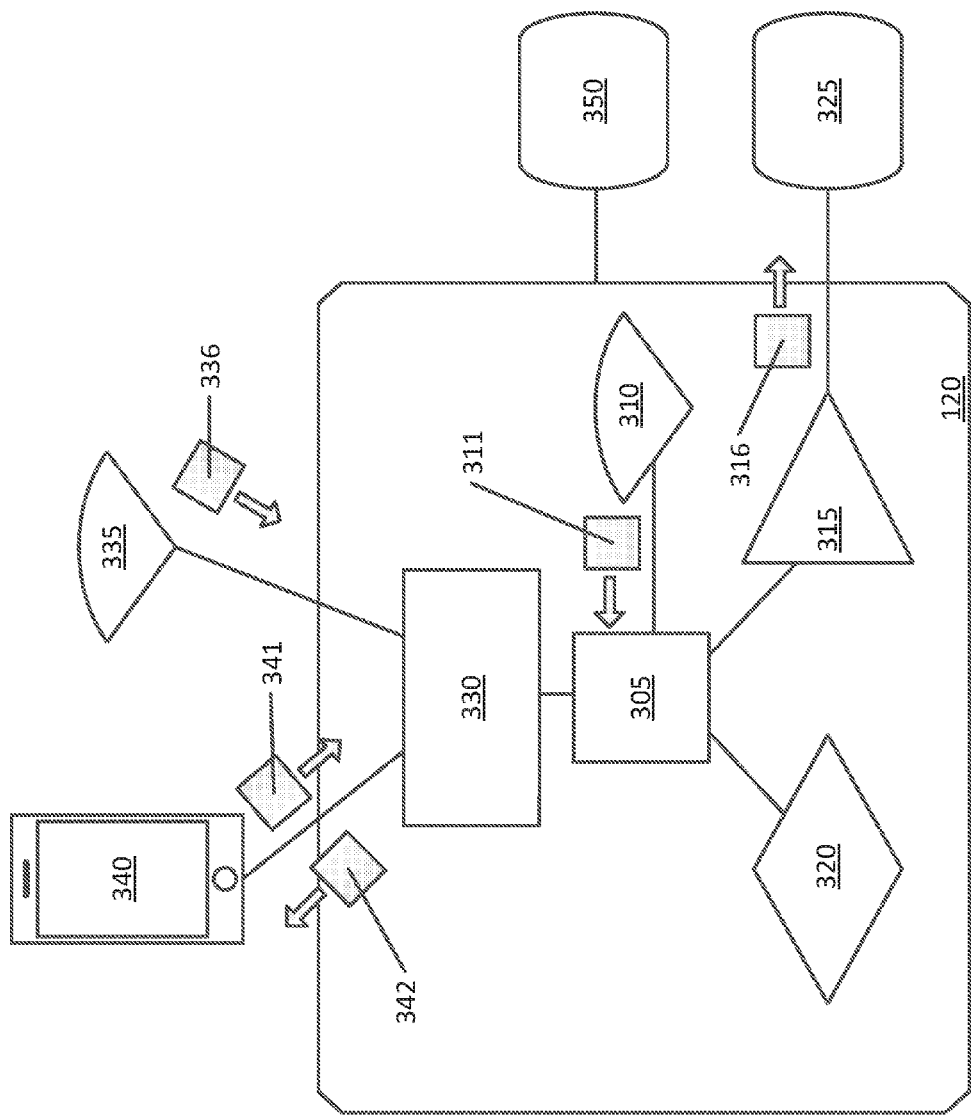
FIG. 4 is a diagram of a protection valve controller.

FIG. 4 shows an example of the main protection valve controller or simply controller 120. As an overview, the controller 120 receives a signal as input. In response to the signal, the controller 120 changes the operation of the main protection valve 110 (of FIG. 3) from run mode to protection mode or vice versa.

The controller 120 includes a central processing unit (CPU) 305, an internal temperature sensor 310, a motor control 315, and a valve sensor(s) 320 communicatively coupled together as shown. The internal temperature sensor 310 is integrated with controller and measures the temperature around the main protection valve 110 and sends a signal corresponding to the measured temperature or a "temperature signal" 311. The CPU 305 makes a determination, based on the temperature signal 311, whether to actuate the mode of the main protection valve 110. The CPU 305 compares the temperature signal 311 to a "freezing threshold" that is indicative of the likelihood of water freezing. The freezing threshold may be set by default or, in some applications, re-set by a user. Based on the comparison, the CPU 305 causes the main protection valve 110 to change modes. In one example, the CPU 305 compares the temperature signal 311 to a freezing threshold temperature. Based on the temperature comparison, the CPU 305 causes the main protection valve 110 to change modes.

For example, when the temperature signal 311 is at or below the freezing threshold and thus, there is a likelihood of water freezing, the CPU 305 causes the main protection valve 110 to change from run mode to protection mode. The CPU 305 may be further configured to compare the temperature signal 311 to a second threshold different than the freezing threshold that is indicative of water that is not likely to freeze. Given this configuration, when the temperature signal 311 is at or above the second threshold and thus, unlikely that water will freeze, the CPU 305 (signals) causes the main protection valve 110 to change from protection mode to run mode.

Based on the determination by the CPU 305, the controller 120 generates, by way of the motor control 315, a motor control signal 316. In response to the motor control signal 316, a motor 325, which is electrically coupled to the controller 120, actuates an advance mechanism to (either) open (or) close the water supply inlet 125, the water supply outlet 130, and the drain outlet 135. The controller 120 knows, by way the valve sensor(s) 320, the state of the water supply inlet 125, the water supply outlet 130, and the drain outlet 135. From this information, the controller 120 can determine whether the main protection valve 110 is in run mode or protection mode. Some examples of the controller 120 report the status of the main protection valve 110 to a user (e.g., such as open, closed, fault, online, offline, to name a few) as will be described in greater detail below.

Some examples of the controller 120 are configured to open and close the main protection valve 110 slowly to prevent damage to the domestic water system 15. The controller 120 opens the main protection valve 110 incrementally to let water gently refill the domestic water system 15. This is beneficial because it reduces water hammer from happening that can damage the domestic water system 15.

A convenient example of the controller 120 is configured periodically open and close of the main protection valve 110, for example, once a year. If the main protection valve 110 is not actuated once in a while (i.e., opened and closed), it is possible for the valve to become stuck. Over time, debris/sediment like calcium builds up inside the main protection valve 110 and can interfere with its proper operation. Routinely actuating the main protection valve 110 advantageously allows any debris/sediment that breaks loose inside the main protection valve 110 to escape.

As shown in FIG. 4, the controller 120 can further include a communication interface 330 configured to receive a number of signals to which the controller 120 can respond. Examples include a temperature signal from a remote temperature sensor, a manual signal from a user device, and a signal from another protection valve. The communication interface 330 can be further configured to send signals, for example, to a user device or to another protection valve.

In the example shown in FIG. 4, the controller 120 is communicatively coupled, by way of the communication interface 330, to a remote temperature sensor 335. Like the internal temperature sensor 310, the remote temperature sensor 335 measures temperature and sends a temperature signal 336 for the controller 120 to respond. The remote temperature sensor 335, however, is separate from the controller 120. This allows the remote temperature sensor 335 to be located remotely from the main protection valve 110. This feature is particularly useful in situations where the main protection valve 110 is less susceptible to experiencing freezing temperatures compared to the domestic water system 15 or the heating system 20.

For example, the main protection valve 110 is located in a heated space (e.g., basement) while portions of the domestic water system 15 run through unheated space (e.g., in an enclosed space against an outside wall, such as a vanity). Advantageously, locating the remote temperature sensor 335 in the unheated space allows the main protection valve 110 to change from run mode to protection mode and protect the domestic water system 15 or heating system 20 from freezing even if the main protection valve 110 itself is not experiencing freezing temperatures.

In the example shown in FIG. 4, the controller 120 is communicatively coupled, by way of the communication interface 330, to a user device, such as a smartphone. The user device 340 runs an application for changing the main protection valve 110 between run mode and protection mode. Using the user device 340 and the application, a user can send a manual signal 341 to the controller 120 to, for example, manually stop water from flowing into the domestic water system 15 from the water supply 25 and empty water from the domestic water system 15 into the drain 35, even when the temperature is not freezing. This feature is particular useful when the user is working on the domestic water system and needs to drain the water or, in the case of a vacation home, an owner wishes to remotely shut off or turn on the water supply coming into their house. In another example, the user activates a manual override switch on the main protection valve 110 to provide the manual signal 341.

As described above, some examples of the controller 120 report the status of the main protection valve 110 to a user. In these examples, the controller 120 sends, by way of the communication interface 330, a status signal 342 to the user device 340. Using the user device 340 and the application, the user can receive a notification of the status of the main protection valve 110, which corresponds to the status signal 342. The notification may be visual, auditory, or a combination of visual and auditory. This feature is particularly useful when the user wants to know if the domestic water system 15 or heating system 20 is drained of water, for example.

Some examples of the controller 120 are communicatively coupled, by way of the communication interface 330, to a thermostat or smart thermostat. The smart thermostat is a home automation device responsible for controlling the main protection valve 110 as well a home's heating, and sometimes air conditioning. The smart thermostat allows a user to control the temperature of their home throughout the day using a schedule, such as setting a lower temperature at night. As the smart thermostat is connected to the internet, the smart thermostat allow a user to control the main protection valve 110 and adjust heating settings from other internet-connected devices, such smartphones. This feature allows a user to easily control the main protection valve 110 when the building 10 is empty, for example. Other features include automatically learning when the building 10 is likely to be occupied, and when it is likely to be empty. Advantageously, this allows the smart thermostat to automatically pre-heat or pre-cool the building 10, so that it is at a comfortable temperature when a resident arrives. If the residents' lifestyle changes, the smart thermostat will gradually adjust the schedule, maintaining energy savings and comfort.

Another example of the controller 120 is communicatively coupled, by way of the communication interface 330, to a smart home gateway. The smart home gateway provides remote control operation of the main protection valve 110 over the internet incorporating a simple and friendly user interface. Advantageously, these examples of the controller 120 allow the main protection valve 110 to be controlled remotely over the internet. Furthermore, notification of the status of the main protection valve 110 can be sent over the internet to a user who is away from home.

Some examples of the communication interface 330 are configured for wireless communication e.g., BLUETOOTH, WI-FI, REDLINK, ZIGBEE, Z-WAVE, and cellular to name a few. Other examples of the communication interface 330 are configured for wired communication, such as X-10. Still other examples of the communication interface 330 are configured for a combination of wireless and wired communication. One example that is particular useful for installing the main protection valve 110 in a building without access to wired communication, such as a vacation cabin in the woods, One example of the main protection valve 110, which is particular useful when there is no access to wired communication, such as digital subscriber line (DSL) or cable modem, is communicatively coupled to a cellular phone or satellite phone. The main protection valve controller 120 is connected to the cellphone phone or satellite phone with a telephone line (or other suitable cable). The main protection valve controller 120 sends, for example, the status of the main protection valve 110 over a cellular or satellite connection. Advantageously, the main protection valve 110 can used in building located in remote areas, such as cabin in the woods, and can be controlled and monitored, remotely.

Moreover, examples of the communication interface 330 can send and/or receive signals, such as the temperature signal 311, as a unicast (one-to-one), multicast (one-to-some), or broadcast (one-to-all). Advantageously, these possible configurations allow the controller 120 to communicate with a wide variety of sensors and devices using various modes of transmission.

In addition to the internal temperature sensor 310 and the remote temperature sensor 335, other sensors, such as a humidity sensor and a leak sensor, are also contemplated. Based on what is sensed (e.g., water in the air, or the presence of a puddle of liquid water), the sensor provides an input to the controller 120. The controller 120 acts on this input and changes mode of the main protection valve 110, accordingly.

Additional, some examples of the controller 120 can act on multiple inputs received from an array of sensors. For example, the controller 120 can receive the temperature signal 311 from the internal temperature sensor 310 and the temperature signal 361 from the remote temperature sensor 335. The controller 120 then makes a determination based on a combination of signals (e.g., an average of temperatures represented by the signals).

FIG. 4 further shows a power source 350 electrically coupled to the main protection valve controller 120 to provide electrical power to the controller 120 and the motor 325. Examples of the power source 350 include a low-voltage battery (e.g., 3 or 12 volts). Using battery power is beneficial in situations in which access to line-voltage power (e.g., 120 volts) is limited or expensive to provide, and, perhaps most importantly, is not available due to an electrical outage from the power grid. As a convenient example of the main protection valve 110, no power is needed to keep the water supply inlet 125 and the water supply outlet 130 open, and the drain outlet 135 closed. It may be convenient to refer to this example of the main protection valve 110 as "normally open" valve. Electrical power is needed to close the water supply inlet 125, and open the water supply outlet 130 and the drain outlet 135; and then reverse operation once conditions have been restored.

Because the main protection valve 110 is normally open, it is anticipated that power consumption is slight, as compared to powering the main protection valve 110 to keep it opened. Other power conserving techniques are also contemplated. For example, the CPU 305 is configured to sleep most of the time and wake up to service communication requests or once every time period (e.g., 30 minutes) to detect the local/remote temperature. Such techniques allow the battery to used longer before requiring replacement.

In other examples of the main protection valve 110, the power source 350 provides primary electrical power while a battery provides backup electrical power. By way of non-limiting examples, the power source 350 includes 48 volt DC provided by a telephone network over a telephone line and low-voltage AC providing primary electrical power to the main protection valve 110. Advantageously, some examples of main protection valve 110 use the telephone line for both power and communication.

It is also contemplated that the power source 350, in some examples, is an energy harvester that harvests electricity from hydro power, solar power, thermal energy, wind energy, salinity gradients and kinetic energy to name a few. For example, an energy harvester captures hydro-electrical power from water following through the main protection valve 110. It is further contemplated that an energy harvester can be used to supplement or augment a battery, e.g., by charging the battery. This arrangement is advantageous to extend the usable life of the battery, particularly when power hungry features like as WI-FI communication are used.

A convenient example of the controller 120 includes a controller board. The controller board contains a wireless microcontroller such as TI CC3200 (WI-FI) or nRF51822 (BLUETOOTH LE), temperature sensor, DC motor controller, battery, optional power harvester, and optional phone line interface. The controller board is enclosed in a waterproof enclosure. By means of software, the controller board implements temperature monitoring, valve control and communications. The wireless microcontroller sleeps most of the time in conserving energy but wakes up to service communication requests or once every 30 minutes to detect local/remote temperature. The controller board is capable of sending control signals to the electromechanical valve(s) controlling the direction of valve rotation and determining the valve open/close position.

Figure 5:
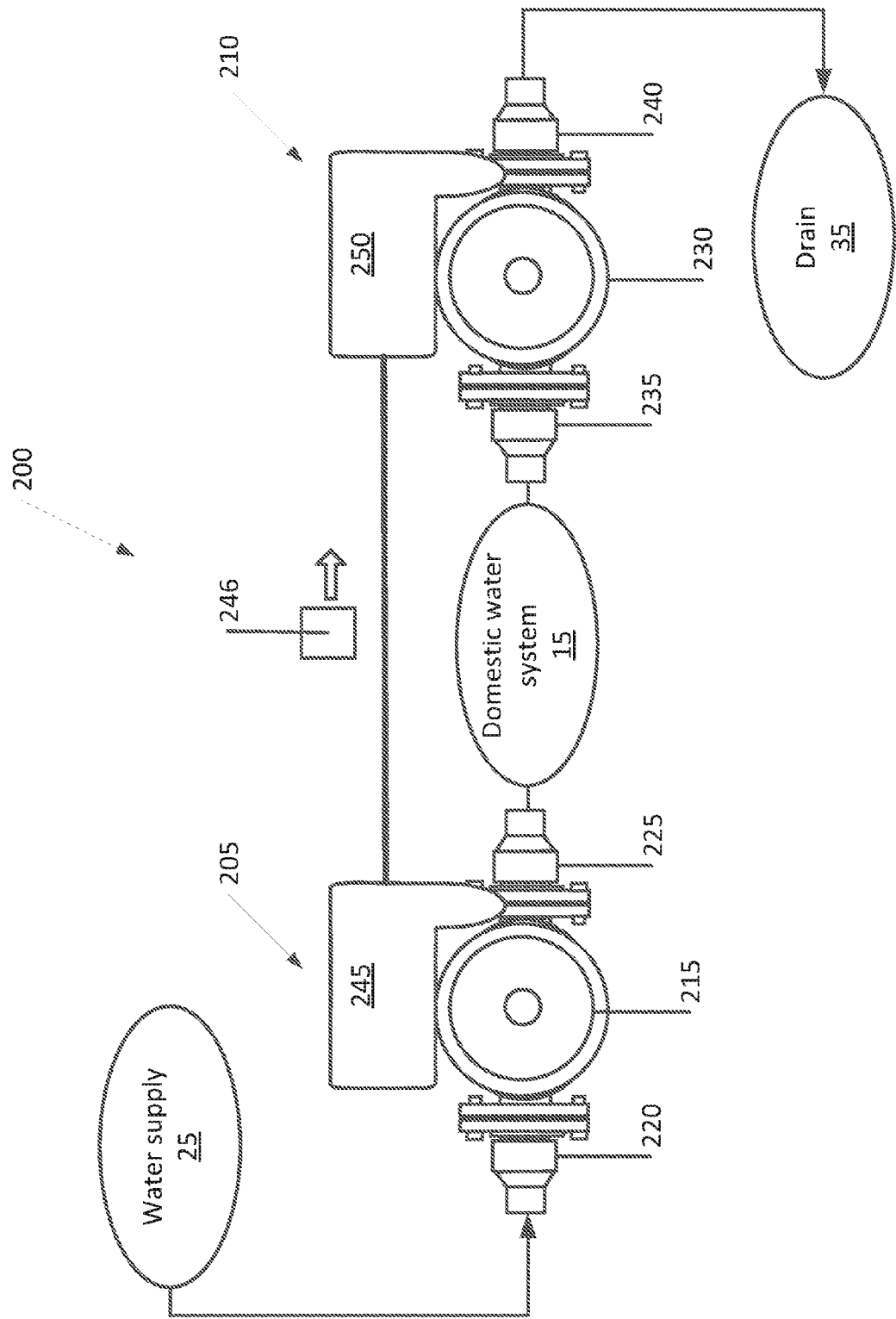
FIG. 5 is a diagram of an example of the system (network) of protection valves.

FIG. 5 shows an example of the system of protection valves 200, including the protection valve 205 and the drain valve 210 located at each end of the domestic water system 15. For explanation purposes, this and other examples of the system 200 are described in the context of protecting the domestic water system 15. By extension, this system description also applies to protecting pipes for the heating system 20 and a domestic hot water tank.

Like the main protection valve described above with reference to FIG. 3, the protection valve 205 and the drain valve 210 each include a valve body 215,230. The protection valve body 215 includes a water supply inlet 220 connecting the protection valve 205 to the water supply 25 and a water supply outlet 225 connecting the protection valve 205 to the domestic water system 15. The drain valve body 230 includes an inlet 235 connecting the drain valve 210 to the domestic water system 15 and an outlet 240 connecting the drain valve 210 to the drain 35.

In the operation, the system 200 switches between run mode and protection mode to protect the domestic water system 15 from damage caused by ice forming in the domestic water system 15. In run mode, the water supply inlet 220 and the water supply outlet 225 are opened while the inlet 235 and outlet 240 of the drain valve 210 are closed. The system 200 operating in this mode allows water to flow from the water supply 25 into the domestic water system 15. In protection mode, the water supply inlet 220 and the water supply outlet 225 are closed while the inlet 235 and outlet 240 of the drain valve 210 are opened. The system 200 operating in this mode empties water from the domestic water system 15 into the drain 35.

The protection valve 205 includes a protection valve controller 245 and the drain valve 210 includes a drain valve controller 250. The controllers 245, 250 are similar to the main protection valve controller 120 described above with reference to FIG. 4. As such, much of the description applies to the protection valve controller 245 and the drain valve controller 250, and is not repeated here for the sake of brevity. A notable exception being the protection valve controller 245 and the drain valve controller 250 operate in an orchestrated manner to switch the system 200 between run mode and protection mode, as will now be described.

The valve controller 245 and the drain valve controller 250 are communicatively coupled, for example, by a wired or wireless connection. The protection valve controller 245 is configured to respond to a signal (such as the temperature signal 311 of FIG. 4), and close the water supply inlet 220 and the water supply outlet 225, thereby stopping water from flowing into the domestic water system 15. In response to the signal, the protection valve controller 245 is further configured to send a protect signal 246 to the drain valve controller 250. The drain valve controller 250, in turn, responds to the protect signal 246 by opening the inlet 235 and outlet 240 allowing water in the domestic water system 15 to empty into the drain 35.

A convenient example of the protection valve 205 is "normally open" and requires no electrical power to keep the water supply inlet 220 and the water supply outlet 225 opened. Electrical power is required to close the water supply inlet 220 and the water supply outlet 225. A convenient example of the drain valve 210 is "normally closed" and requires no electrical power to keep the inlet 235 and the outlet 240 closed. Electrical power is required to open the inlet 235 and the outlet 240; and then reverse this operation back to its normally closed state.

The disclosure further contemplates examples of the system 200 including more than two protection valves (e.g., three or four protection valves). In a centralized example of the system 200, one protection valve is the master and the other protection valves are slave valves. The master protection valve sends (e.g., as a unicast, multicast or broadcast) a communication signal to the slave protection valves to act on and switch the system 200 between run mode and protection mode in an orchestrated manner. When the threshold for threatening conditions (e.g., freezing temperatures or loss of power) has abated, the master valve reverses the order from protection mode to run mode.

In decentralized examples of the system 200, there is a peer-to-peer relationship amongst the protection valves. A first peer protection valve sends (e.g., as a unicast, multicast or broadcast) a communication signal to a second peer protection valve (and vice versa) to act on and switch the system 200 between run mode and protection mode in an orchestrated manner.

Examples of the system 200 can use several different modes of signal transmission. For example, a first protection valve receives a temperature signal from a remote temperature sensor as a unicast (one-to-one) communication signal. The first protection valve in turn propagates a communication signal (e.g., a protection signal) to one or more other additional (second) protection valves as a unicast, multicast or broadcast. Advantageously, this allows a wide variety of transmission media to be used.

Operation of the protection valve 100 and the system of protection valves 200 (and their examples) are described in greater detail in the context of following applications.

Figure 6A:
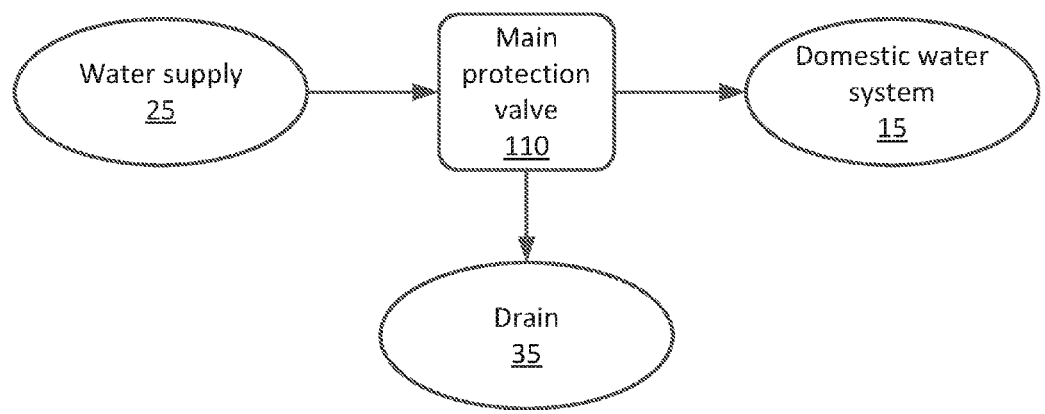
FIGS. 6A and 6B are a diagram and an associated signaling diagram of a main protection valve protecting the domestic water system from damage caused by water freezing in the domestic water system.

Application 1—Protecting the domestic water system. FIG. 6A shows an example of the main protection valve 110 connected to the water supply 25, the domestic water system 15, and the drain 35. In run mode, the main protection valve 110 allows water from the water supply 25 to flow into the domestic water system 15; and stops water from emptying from the domestic water system 15 into the drain 35.

Figure 6B:
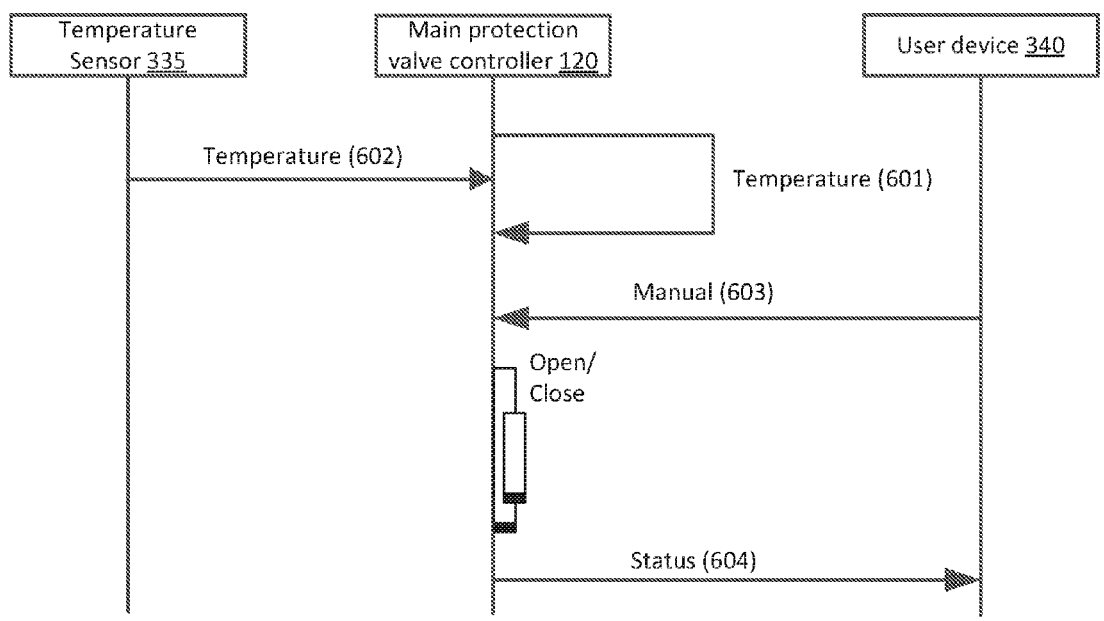

With reference to FIG. 6B, the main protection valve controller 120 receives a temperature signal 601 from an internal temperature sensor (e.g., the internal temperature sensor 310 of FIG. 4). Alternatively, a temperature signal 602 comes from the remote temperature sensor 335. When the temperature signal 601 (or 602) is at or below a "freezing" threshold, the main protection valve controller 120 switches the main protection valve 110 from run mode to protection mode. The main protection valve 110 stops water from flowing into the domestic water system 15 and empties water from the domestic water system 15 into the drain 35. The main protection valve 110 in protection mode thereby protects the domestic water system 15 from possible damage caused by water freezing in the domestic water system 15.

In another example, the main protection valve controller 120 is further configured to respond to a temperature signal (not shown) that is at or above a second threshold greater than the "freezing" threshold. The main protection valve controller 120 switches the main protection valve 110 from protection mode to run mode. The main protection valve 110 allows water from the water supply 25 to flow into the domestic water system 15; and stops water from emptying from the domestic water system 15 into the drain 35. The main protection valve 110 in run mode thereby fills the domestic water system 15.

In the example shown in FIG. 6B, the main protection valve controller 120 is further configured to respond to a manual signal 603 sent from the user device 340 (of FIG. 4). The main protection valve controller 120 switches the main protection valve 110 from run mode to protection mode. The main protection valve 110 stops water from flowing into the domestic water system 15 and empties water from the domestic water system 15 into the drain 35. As also shown, the main protection valve controller 120 is further configured to send a status signal 604 to the user device 340, notifying a user, for example, that the water has been drained from the domestic water system 15.

Figure 7A:
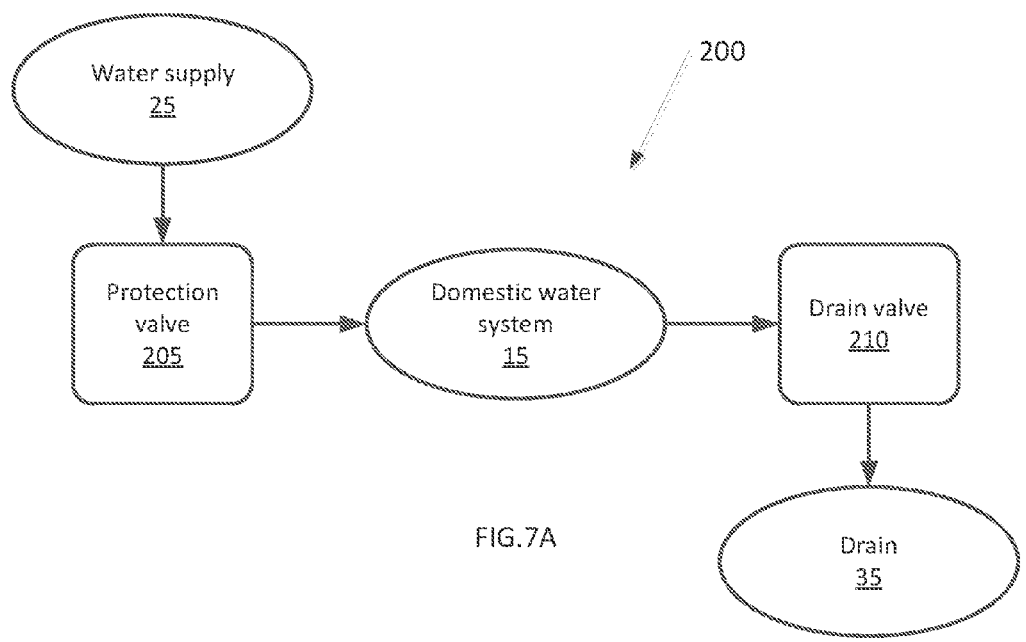
FIGS. 7A and 7B are a diagram and an associated signaling diagram of a system of protection valves protecting the domestic water system from damage caused by water freezing in the domestic water system.

Application 2—Protecting the domestic water system. FIG. 7A shows an example of the system of protection valves 200 including the protection valve 205 and the drain valve 210. The protection valve 205 is connected to the water supply 25 and the domestic water system 15. The drain valve 210 is connected to the domestic water system 15 and the drain 35. In run mode, the system 200 allows water to flow from the water supply 25 into the domestic water system 15; and stops water from emptying from the domestic water system 15 into the drain 35.

Figure 7B:
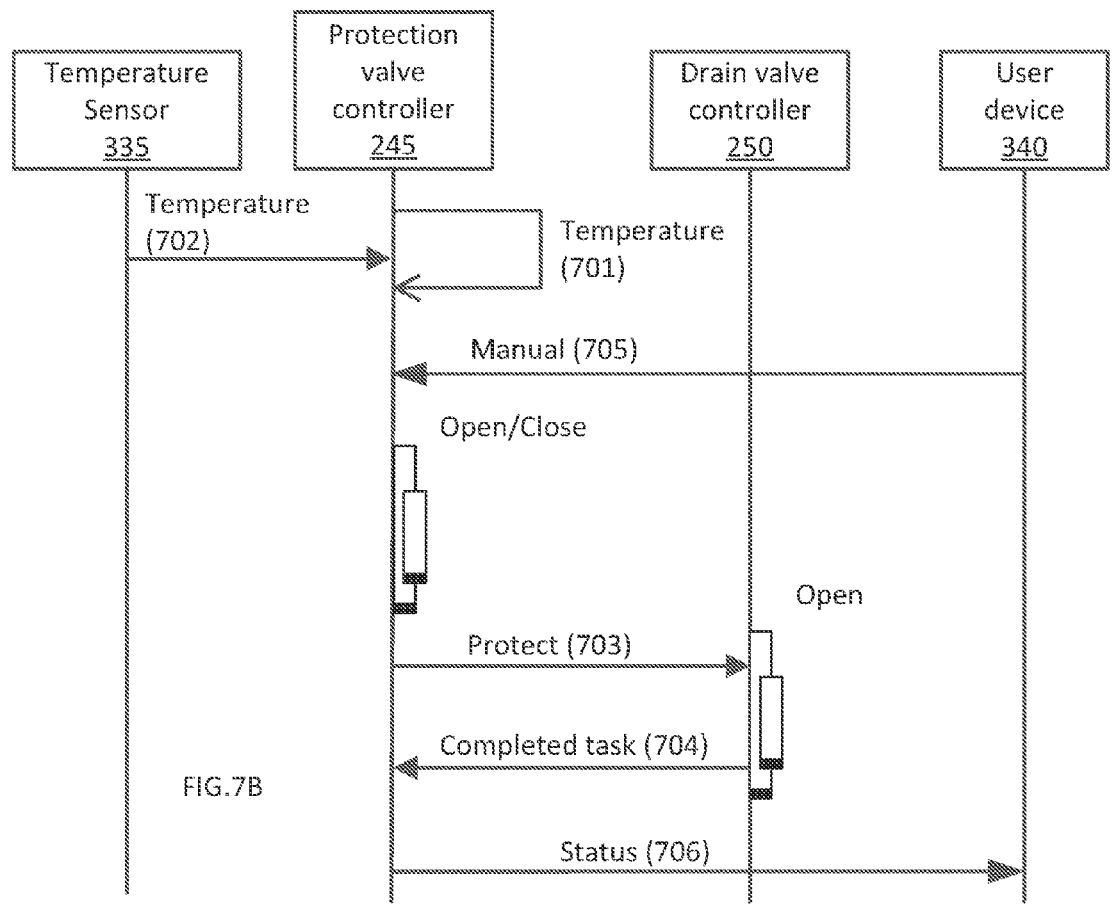

With reference to FIG. 7B, the protection valve controller 245 and the drain valve controller 250 are communicatively coupled. The protection valve controller 245 receives a temperature signal 701 from an internal temperature sensor (e.g., the internal temperature sensor 310 of FIG. 4). Alternatively, a temperature signal 702 comes from the remote temperature sensor 335. When the temperature signal 701 (or 702) is at or below a freezing threshold, the protection valve controller 245 and the drain valve controller 250, in an orchestrated manner, switch the system 200 from run mode to protection mode. The protection valve 205 stops water from flowing into the domestic water system 15. The protection valve controller 245 sends a protect signal 703 to the drain valve controller 250. In response, the drain valve 210 empties water from the domestic water system 15 into the drain 35. The drain valve controller 250 is further configured to close the drain valve 210 after a period of time (which, in some examples, may be preset) and send a completed task signal 704 to the protection valve controller 245. The system 200 in protection mode thereby protects the domestic water system 15 from possible damage caused by water freezing in the domestic water system 15.

When switching the system 200 from protection mode to run mode, it may be convenient to fill the domestic water system 15, automatically. In the example shown in FIG. 7B, the drain valve controller 250 is further configured to send the completed task signal 704 when the drain valve is closed. The protection valve controller 245 is further configured to respond to the completed task signal 704 and a temperature signal (not shown) that is at or above a second threshold greater in value than the "freezing" threshold. The protection valve 205 opens, allowing water from the water supply 25 to flow into the domestic water system 15. The system thereby fills the domestic water system 15, automatically.

In the example shown in FIG. 7B, the protection valve controller 245 is further configured to respond a manual signal 705 sent from the user device 340. The protection valve controller 245 and the drain valve controller 250, in an orchestrated manner, switches the system 200 from run mode to protection mode, as described above. As also shown, the protection valve controller 245 is further configured to send a status signal 706 to the user device 340, notifying a user, for example, that water has been drained from the domestic water system 15.

Figure 8A:
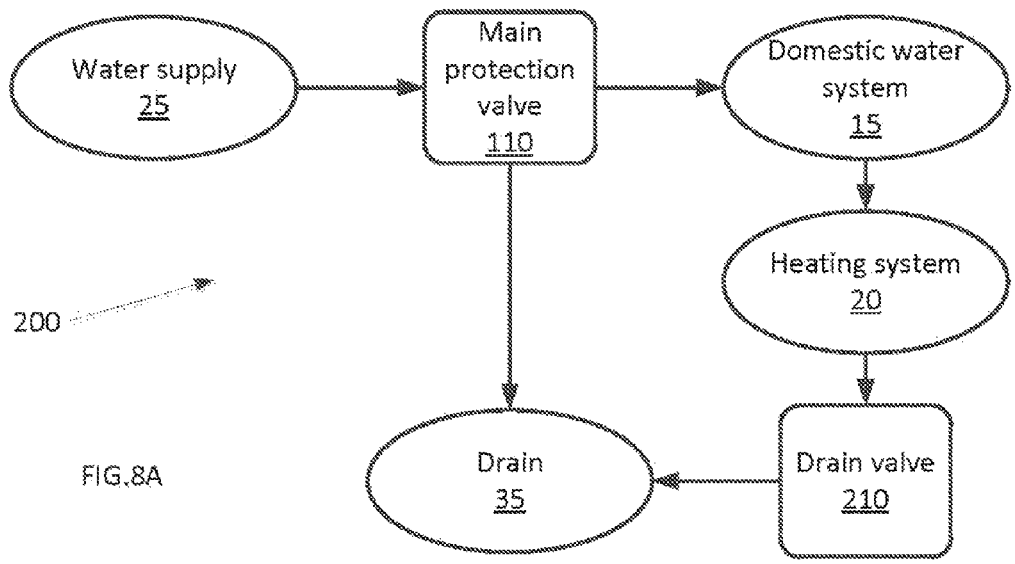
FIGS. 8A and 8B are a diagram and an associated signaling diagram of a system of protection valves protecting the domestic water system and heating system from damage caused by water freezing in the domestic water system and/or heating system.

Application 3—Protecting the domestic water system and the heating system. FIG. 8A shows the domestic water system 15 and the heating system 20 interconnected. As discussed previously, the domestic water system 15 and the heating system 20 can be interconnected by a one-way valve. The figure further shows an example of the system 200 including the main protection valve 110 and the drain valve 210. The main protection valve 110 is connected to the water supply 25, the domestic water system 15, and the drain 35. The drain valve 210 is connected to the drain 35. In run mode, the system 200 allows water to flow from the water supply 25 into the domestic water system 15 and, in turn, into the heating system 20. In normal, above freezing temperature run mode, the system 200 prevents water from emptying from the domestic water system 15 and the heating system 20 into the drain 35.

Figure 8B:
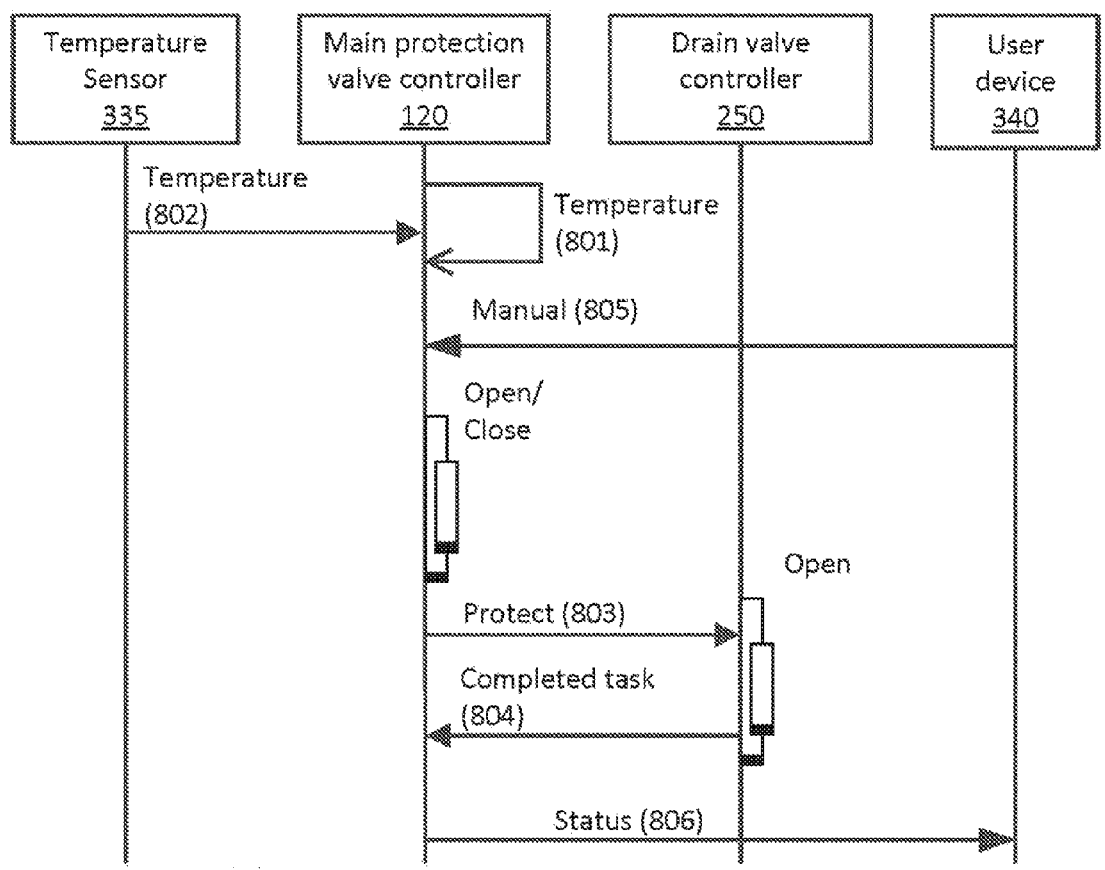

With reference to FIG. 8B, the main protection valve controller 120 and drain valve controller 250 are communicatively coupled. The main protection valve controller 120 receives a temperature signal 801 from an internal temperature sensor (e.g., the internal temperature sensor 310 of FIG. 4). Alternatively, a temperature signal 802 comes from the remote temperature sensor 335. When the temperature signal 801 (or 802) is at or below a designated "freezing" activation threshold, the main protection valve controller 120 and the drain valve controller 250, in an orchestrated manner, switch the system 200 from run mode to protection mode. The main protection valve 110 stops water from flowing into the domestic water system 15 and allows the water in the domestic water system 15 to flow into the drain 35. The main protection valve controller 120 sends a protect signal 803 to the drain valve controller 250. In response, the drain valve 210 empties water from the heating system 20 into the drain 35. The drain valve controller 250 is further configured to close the drain valve 210 after a period of time (which, in some examples, may be preset) and send a completed task signal 804 to the main protection valve controller 120. The system 200 in protection mode thereby protects the domestic water system 15 and the heating system 20 from possible damage caused by water freezing in the systems 15,20.

In the example shown in FIG. 8B, the main protection valve controller 120 is further configured to respond to a manual signal 805 sent from the user device 340. The main protection valve controller 120 and the drain valve controller 250, in an orchestrated manner, switch the system 200 from run mode to protection mode, as described above. As also shown, the main protection valve controller 120 is further configured to send a status signal 806 to the user device 340, notifying a user, for example, that water has been drained from the domestic water system 15.

Figure 9A:
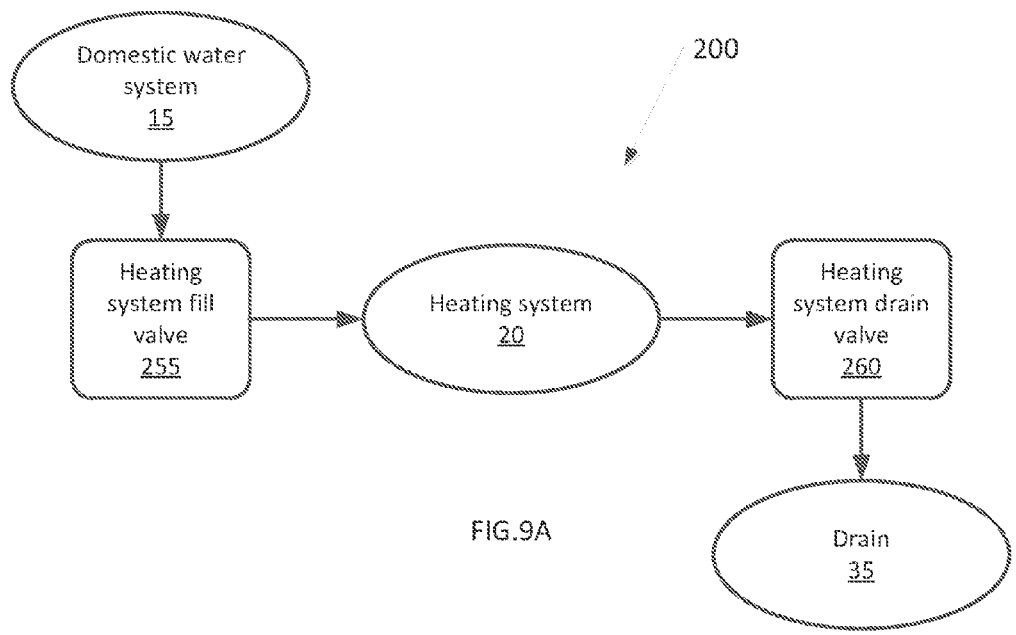
FIGS. 9A and 9B are a diagram and an associated signaling diagram of a system of protection valves protecting the heating system from damage caused by water freezing in the heating system.

Application 4—Protecting the heating system. FIG. 9A shows an example of the system of protection valves 200 including a heating system fill valve 255 and a heating system drain valve 260. The heating system fill valve 255 connects the heating system 20 to the domestic water system 15 and is used to fill up the heating system 20 up with water and to keep the heating system 20 filled with water. Advantageously, the heating system fill valve 255 can be used in place of a one-way valve or provide extra safety to an existing one-way valve. Once the heating system 20 is filled with water, the heating system fill valve 255 is closed. A convenient example of the heating system fill valve 255 is "normally closed" and does not require electrical power to stay closed. The heating system drain valve 260 connects the heating system 20 to the drain 35. In run mode, the system 200 stops water from emptying from the heating system 20 into the drain 35 and, thus, maintains a closed system for the heating system 20 to operate.

Figure 9B:
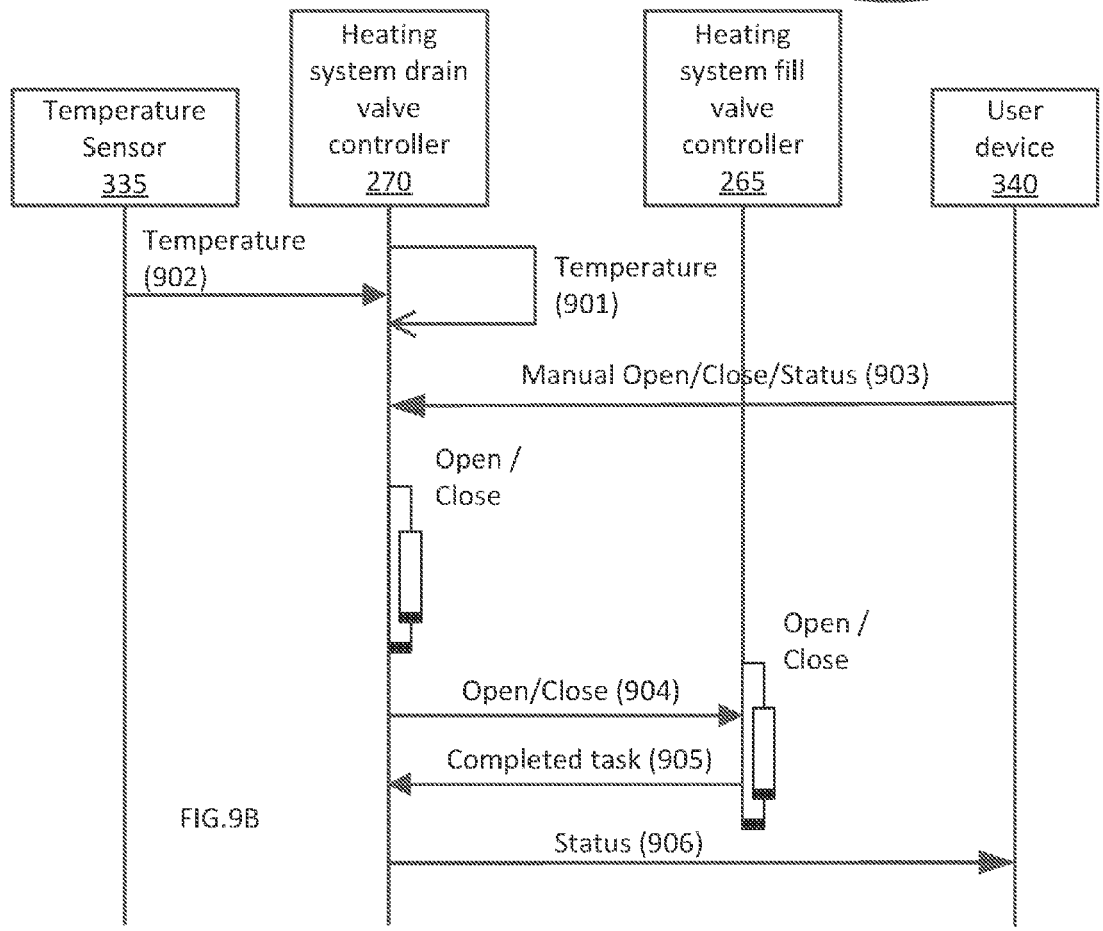

With reference to FIG. 9B, a heating system fill valve controller 265 and the heating system drain valve controller 270 are communicatively coupled. The heating system fill valve controller 265 and the heating system drain valve controller 270 are each similar to the main protection valve controller 120 described above with reference to FIG. 4. As such, much of the description applies to the heating system fill valve controller 265 and the heating system drain valve controller 270, and is not repeated here for the sake of brevity.

The heating system drain valve controller 270 receives a temperature signal 901 from an internal temperature sensor (e.g., the internal temperature sensor 310 of FIG. 4) or a temperature signal 902 from the remote temperature sensor 335. When the temperature signal 901 (or 902) is at or below a freezing threshold, the heating system fill valve controller 265 and the heating system drain valve controller 270, in an orchestrated manner, switch the system 200 from run mode to protection mode. Alternatively, the heating system drain valve controller 270 receives a manual signal 903 from the user device 340 and switches the system 200 from run mode to protection mode.

In response to the temperature signal 901/902 or to the manual signal 903, the heating system drain valve controller 270 checks that the heating system fill valve 255 is closed. The heating system drain valve controller 270 sending a close signal 904 to the heating system fill valve controller 265. The heating system fill valve controller 265 responds by closing the heating system fill valve 255. The heating system fill valve controller 265 then sends a completed task signal 905 to the heating system drain valve controller 270.

In response to the completed task signal 905, the heating system drain valve controller 270 opens the heating system drain valve 260 emptying water from the heating system 20 into the drain 35. The heating system drain valve controller 270 is further configured to close the heating system drain valve 260 after a period of time (which, in some examples, may be preset). The system 200 in protection mode thereby protects the heating system 20 from possible damage caused by water freezing in the heating system 20.

In other examples of the system 200, the heating system fill valve controller 265 periodically sends a signal (not shown) indicating whether the status of heating system fill valve is open or closed. In these examples, when the heating system drain valve controller 270 receives both the temperature signal 901/902 (or to the manual signal 903) and a closed status signal, the heating system drain valve controller 270 responds by switching the system 200 from run mode to protection mode, as described above.

In the example shown in FIG. 9B, the heating system drain valve controller 270 is further configured to send a status signal 906 to the user device 340, notifying a user, for example, that water has been drained from the heating system 20.

Figure 10A:
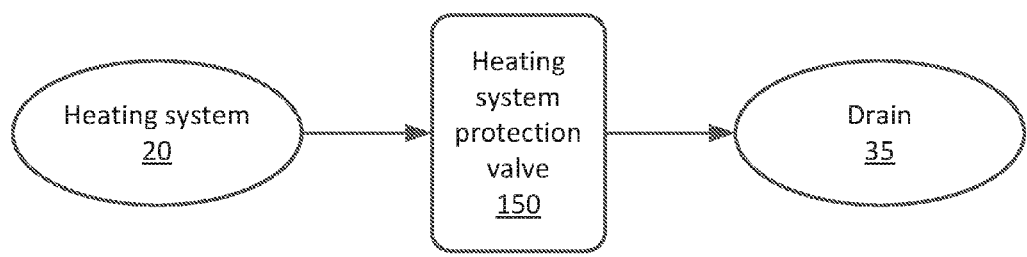
FIGS. 10A-10C are diagrams and an associated signaling diagram of a heating system protection valve protecting the heating system from damage caused by water freezing in the heating system.

Application 5—Protecting the heating system. FIG. 10A shows an example of the heating system protection valve 150 connected to the heating system 20 and the drain 35. In run mode, the heating system protection valve 150 stops water from emptying from the heating system 20 into the drain 35. A convenient example of the heating system protection valve 150 is "normally closed" and does not require electrical power to remain closed.

Figure 10C:
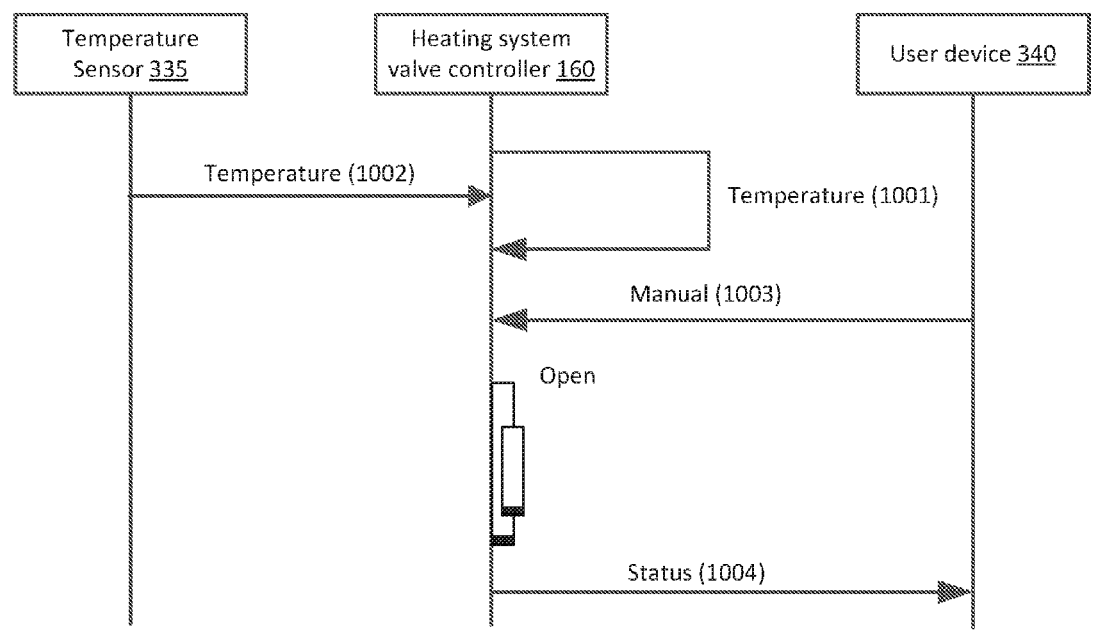
Figure 10B:
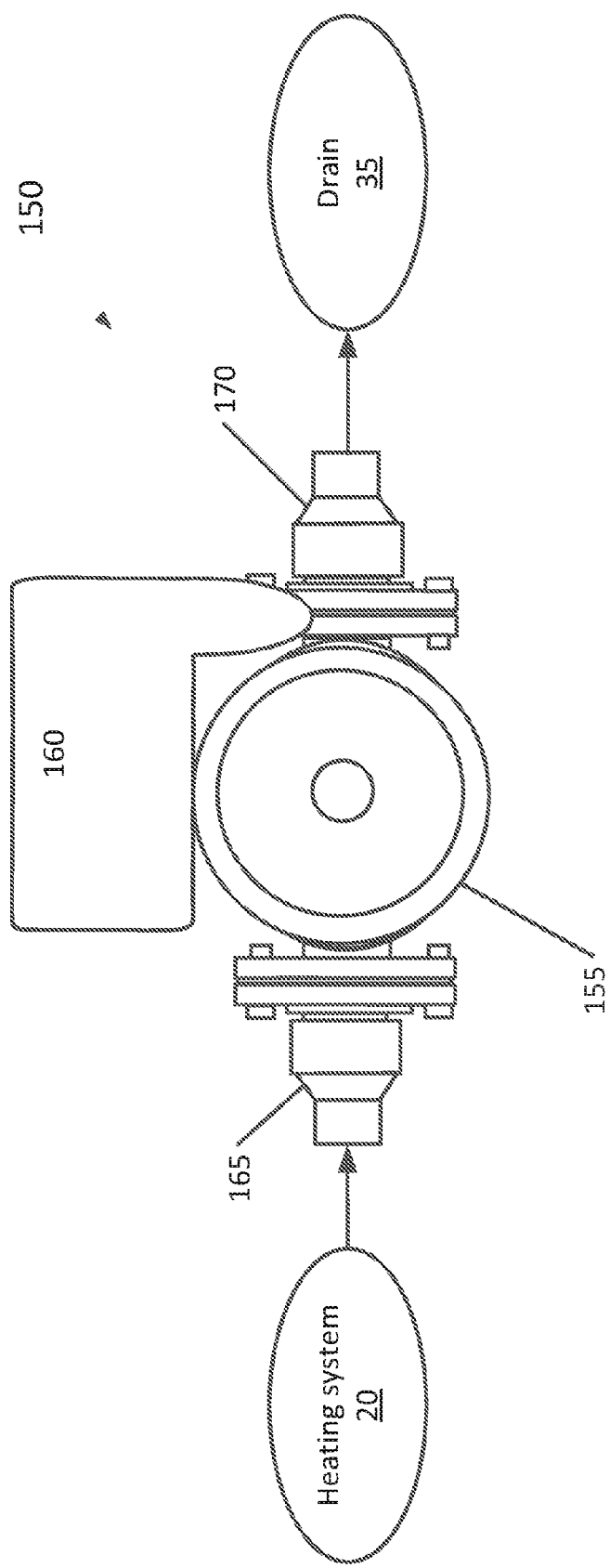

FIG. 10B shows an example of the heating system protection valve 150 including a valve body 155 and a heating system protection valve controller 160. The heating system protection valve controller 160 is similar to the main protection valve controller 120 described above with reference to FIG. 4. As such, much of the description applies to the heating system protection valve controller 160 and is not repeated here for the sake of brevity. The valve body 155 includes a heating system inlet 165 and drain outlet 170. The heating system inlet 165 connects the heating system protection valve 150 to the heating system 20. The drain outlet 170 connects the heating system protection valve 150 to the drain 35.

With reference to FIG. 10C, the heating system protection valve controller 160 receives a temperature signal 1001 from an internal temperature sensor (e.g., the internal temperature sensor 310 of FIG. 4). Alternatively, a temperature signal 1002 comes from the remote temperature sensor 335. When the temperature signal 1001 (or 1002) is at or below a "freezing" threshold, the heating system protection valve controller 160 switches the heating system protection valve 150 from run mode to protection mode. The heating system protection valve 150 opens and empties water from the heating system 20 into the drain 35. The heating system protection valve 150 in protection mode thereby protects the heating system 20 from possible damage caused by water freezing in the heating system 20.

In the example shown in FIG. 10C, the heating system protection valve controller 160 is further configured to respond to a manual signal 1003 sent from the user device 340. The heating system protection valve controller 160 switches the heating system protection valve 150 from run mode to protection mode. The heating system protection valve 150 opens and empties water from the heating system 20 into the drain 35. As also shown, the heating system protection valve controller 160 is further configured to send a status signal 1004 to the user device 340, notifying a user, for example, that water has been drained from the heating system 20.

Figure 11:
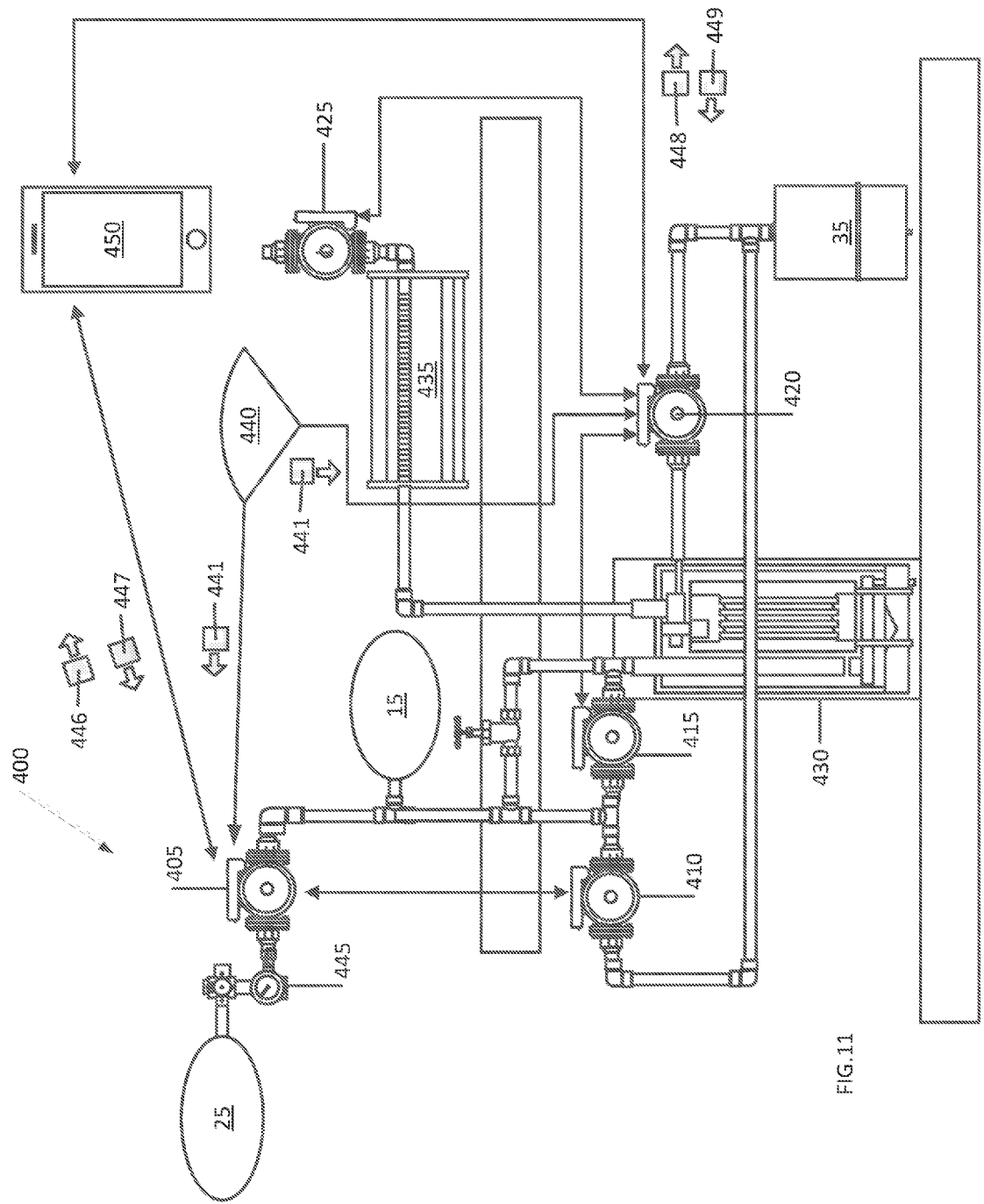
FIG. 11 is a diagram of a system (network) of protection valves protecting the domestic water system and heating system from damage caused by water freezing in the domestic water system and/or heating system.

FIG. 11 shows another example system of protection valves 400 that may be used in a typical two floor building, such as a two story house, to meet the water and heating needs of its occupants while reducing the risk of pipe breakage cause by water freezing. The system of protection valves 400 includes a protection valve 405 (e.g., the protection valve 205 of FIG. 3), a drain valve 410 (e.g., the drain valve 210 of FIG. 5), a heating system fill valve 415 (e.g., the heating system fill valve 255 of FIG. 9A), a heating system drain valve 420 (e.g., the heating system drain valve 260 of FIG. 9A), and an air bleed valve(s) 425 (similar to the heating system protection valve 150 of FIG. 10A).

The protection valve 405 connects the water supply 25 to the domestic water system 15 and a heating system (e.g., the heating system 20 for FIG. 2B) including at least a heat source 430 (typically a boiler or furnace) and radiator(s) 435 (one of which is shown). The drain valve 410 connects the domestic water system 15 to the drain 35. The heating system fill valve 415 connects the domestic water system 15 to the heating system. The heating system drain valve 420 connects the heating system to the drain 35. The air bleed valve(s) 425 (one of which is shown) connects the heating system 20 to the atmosphere.

As shown, the air bleed valve(s) 425 is connected to the heating system (including the heat source 430 and the radiator 435). Hot water from the heat source 430 is conducted through pipes to the radiator 435. The radiator 435 transfers heat from the hot water to the ambient air heating the building (or a room in the building) by way of convection, conduction or radiation.

The protection valve 405 and the heating system drain valve 420 receive a temperature signal 441 outside a threshold from a remote temperature 440 (e.g., the remote temperature sensor 335 of FIG. 5). In response, the protection valve 405 and the heating system drain valve 420, in an orchestrated manner, switch the system 400 from run mode to protection mode. The protection valve 405 stops water from flowing into the domestic water system 15 from the water supply 25. The protection valve 405 sends a protect signal to the drain valve 410. In response, the drain valve 410 empties water from the domestic water system 15 into the drain 35.

The heating system drain valve 420 checks whether it has received a closed signal from the heating system fill valve 415, indicating that the heating system fill valve 415 is closed. The heating system drain valve 420 sends an open signal to the air bleed valve(s) 425. Opening the air bleed valve(s) 425 breaks any vacuum in the heating system 20 and helps drain water from the heating system. With the heating system fill valve 415 closed and the air bleed valve(s) 425 opened, the heating system drain valve 420 empties water from the heating system (including the heat source 430 and the radiator 435) into the drain 35.

As shown in the example of FIG. 11, the water supply 25 and the protection valve 405 are connected by a water flow detector 445. The water flow detector 445 measures the rate of water flowing (typically in gallons per minute or gpm) into the domestic water system 15 from the water supply 25. The water flow detector 445 provides an indication when the flow of water is above or below a set threshold (e.g., 10 gpm) over predefined period of time. Examples of the system 400 use the measured rate (or provided indication thereof) as input (signal) to switch the system 400 between run mode and protection mode.

As shown in the example of FIG. 11, the protection valve 405 and the heating system drain valve 420 are further configured to respond to a manual signal 447 and 449, respectively, sent from a user device 450 (e.g., the user device 340 of FIG. 5). The protection valve 405 and the heating system drain valve 420, in an orchestrated manner, switch the system 400 from run mode to protection mode, as described above. As also shown, the protection valve 405 and the heating system drain valve 420 are further configured to send a status signal 446 and 448, respectively, to the user device 450, notifying a user, for example, that water has been drained from the domestic water system 15 and the heating system (including the heat source 430 and the radiator 435).

The following outlines an example of a procedure for filling the heating system after it has been drained from water. The fill procedure can be started from a manual command sent from an application running on the user device 450 or a web application. The application sends the manual command to the protection valve 405. The protection valve 405 validates that the drain valve 410 and the heating system drain valve 420 are closed; and that the heating system fill valve 415, and the air bleed valve(s) 425 are closed. The protection valve 405 opens and allows water to fill the domestic water system 15. After a few minutes, the protection valve 405 sends a signal to the air bleed valve(s) 425 to open. After the air bleed valve(s) 425 opens, the protection valve 405 sends a signal to the heating system fill valve 415 to open. The home owner/plumber can monitor for water coming out of the air bleed valve(s) 425 and stop the fill procedure from the phone/web application. This feature is particularly useful when there is no one-way valve between the domestic water system 15 and the heating system. The system 400 closes the air bleed valve(s) 425 and the heating system fill valve 415.

Figure 12A:
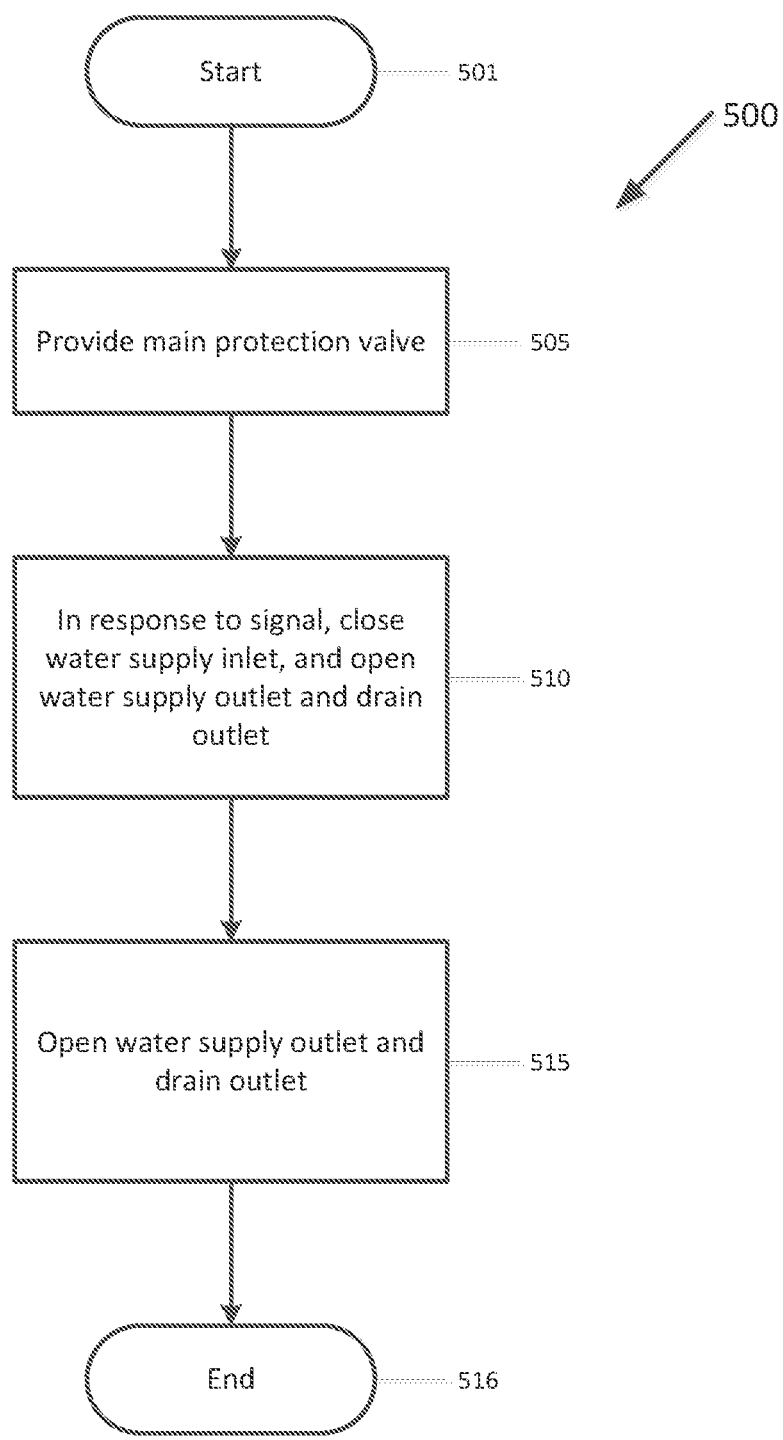
FIGS. 12A and 12B are flows charts of example processes for protecting a domestic water system and/or heating system from damage caused by water freezing in the domestic water system and/or heating system.

FIG. 12A shows an example of a process 500 for protecting a domestic water system (e.g., the domestic water system 15 of FIG. 2A) from damage caused by water freezing in the domestic water system. The process 500 starts (501) with a main protection valve being provided (505), such as the main protection valve 110 of FIG. 3. In response to a first signal, the process 500 closes (510) the water supply inlet thereby inhibiting water from flowing from the water supply into the domestic water system. The process 500 opens (515) the water supply outlet and the drain outlet thereby emptying water from the domestic water system into the drain. The process 500 ends (516) with the domestic water system protected from damage caused by water freezing in the domestic water system.

Figure 12B:
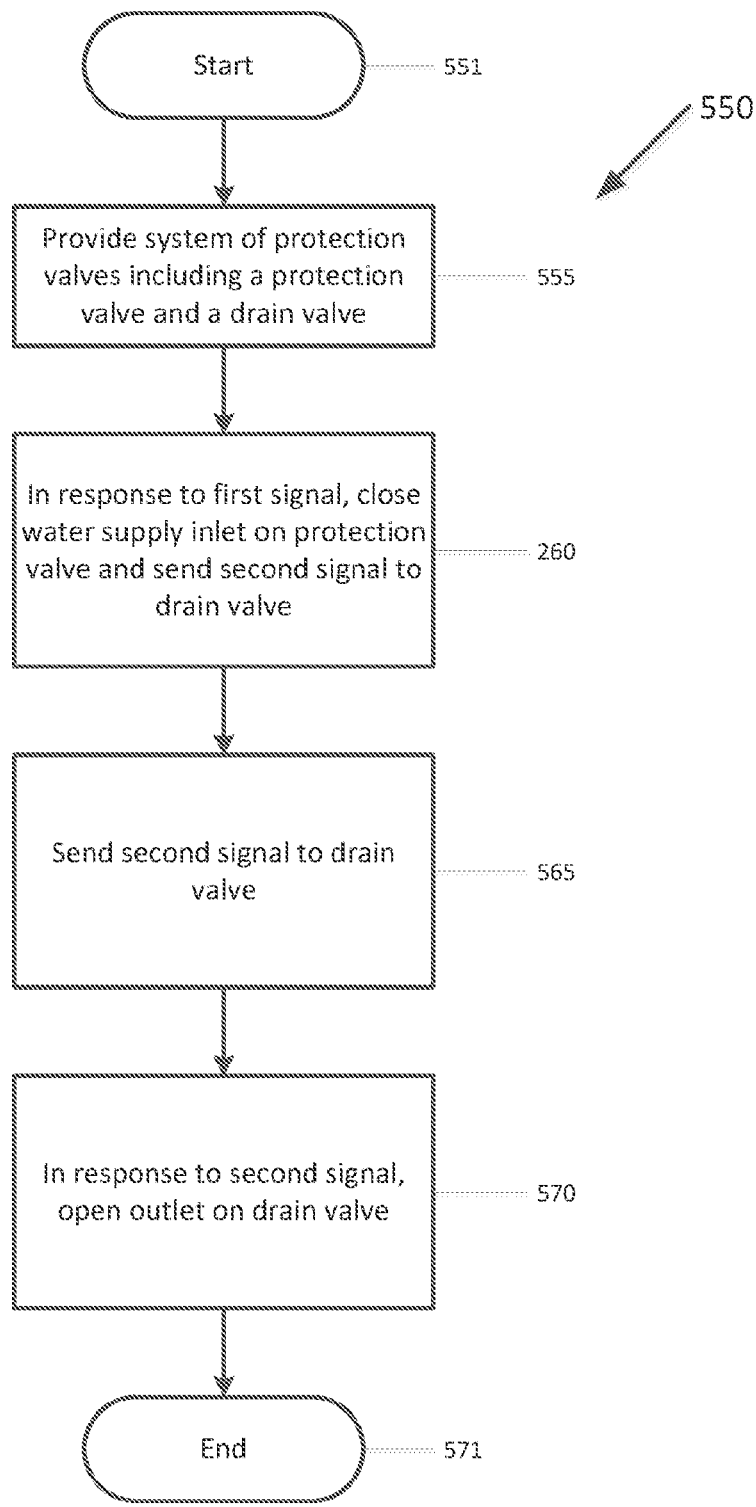

FIG. 12B shows an example of a process 550 for protecting a domestic water system (e.g., the domestic water system 15 of FIG. 2B) and/or heating system (e.g., the heating system 20 of FIG. 2B) from damage caused by water freezing in the domestic water system and/or heating system. The process 500 starts (551) with a system of protection valves being provided (555), such as the system of protection valve 200 of FIG. 5. The system of protection valves includes a protection valve, such as the protection valve 205 of FIG. 5, and a drain valve, such as the drain valve 210 of FIG. 5. In response to a first signal, the process 550 closes (560) the water supply inlet of the protection valve thereby inhibiting water from flowing from a water supply into the domestic water system and/or heating system. The process 550 sends (565) a second signal to the drain valve. In response to the second signal, the process 550 opens (570) the outlet of the drain valve thereby emptying water from the domestic water system or heating system into a drain. The process 550 ends (571) with the domestic water system and/or heating system protected from damage caused by water freezing in the domestic water system and/or heating system.

It will be recognized that numerous different features and/or components are presented in the examples shown and described herein, and that no one example may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus, it is to be distinctly understood that claims directed to any such combination of features and/or components, whether or not specifically embodied herein, are intended to find support in the present disclosure.

Thus, while the subject matter of the present disclosure has been described with reference to the foregoing examples and considerable emphasis has been placed herein on the structures and structural interrelationships between the component parts of the examples disclosed, it will be appreciated that other examples can be made and that many changes can be made in the examples illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

Scope of the invention is thus indicated by the appended claims, rather than by the foregoing description, and all changes that come within the meaning and range of equivalency of the claims are therefore intended to be embraced therein. In the claims, comprise, include, and/or plural forms of each are open-ended and include the listed parts and can include additional parts that are not listed. And/or is open-ended and includes one or more of the listed parts and combinations of the listed parts. As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A main protection valve comprising: a valve body including: a water supply inlet adapted to couple to a water supply, the water supply inlet at a first end of the valve body; a water supply outlet adapted to couple to a domestic water system, the water supply outlet at a second end of the valve body opposite the first end; a drain outlet adapted to couple to a drain, the drain outlet at a third end of the valve body between the first end and second end; a main protection valve controller directly coupled to the valve body, the controller including a central processing unit, a motor control, and a valve sensor communicatively coupled, the controller further communicatively coupled to a temperature sensor; a direct current (DC) motor electrically coupled to the motor control to actuate the valve between a run mode and a protection mode; wherein, in the run mode, the water supply inlet and the water supply outlet are opened, and the drain outlet is closed; wherein, in the protection mode, the water supply inlet is closed, and the water supply outlet and the drain outlet are opened; and wherein, the main protection valve controller is further configured to, in response to a first signal, send a first motor control signal to the DC motor to actuate the main protection valve from the run mode to the protection mode thereby 1) inhibiting water from flowing from the water supply into the domestic water system and 2) emptying water from the domestic water system into the drain.

2. The main protection valve of claim 1, wherein the first signal is representative of a temperature; and
   wherein the main protection valve controller is further configured to:
   compare the temperature to a threshold; and
   based on the compare, actuate the main protection valve from the run mode to the protection mode.

3. The main protection valve of claim 2, wherein the main protection valve controller is disposed proximate to the valve body and includes a temperature sensor integrated with the main protection valve controller.

4. The main protection valve of claim 2, wherein the main protection valve controller is communicatively coupled to a temperature sensor located external to the main protection valve controller.

5. The main protection valve of claim 1, wherein the main protection valve controller includes a DC motor controller for controlling the DC motor, the DC motor controller is electrically coupled to an electrical power source selected from the group consisting of: a battery, an energy harvester, and a combination thereof.

6. The main protection valve of claim 5, wherein the electrical power source is a telephone network; and
   wherein the main protection valve controller is electrically coupled to the telephone network by a telephone line and draws power from the telephone network.

7. The main protection valve of claim 1, wherein the main protection valve controller is communicatively coupled to a telephone line and provides a status of the main protection valve over the telephone line.

8. The main protection valve of claim 7, wherein the telephone line communicatively couples the main protection valve controller to a cellular phone or to a satellite phone; and
   wherein the main protection valve controller provides the status of the main protection valve over a cellular connection or a satellite connection.

9. The main protection valve of claim 1, wherein the main protection valve controller includes a communication interface communicatively coupled to a wireless network, the communication interface configured to send/receive signals to/from a second protection valve controller, to receive a temperature signal from a remote sensor, and send a notification signal to a user device over the wireless network.

10. The main protection valve of claim 9, wherein the communication interface communicates wirelessly in accordance with any one of BLUETOOTH, WIFI, REDLINK, ZIGBEE, and ZWAVE wireless protocols.

11. The main protection valve of claim 1, wherein the main protection valve controller is further configured to, in response to a second signal, send a second motor control signal to the DC motor to actuate the main protection valve from the protection mode to the run mode allowing water to flow into the domestic water system and stop water in the domestic water system from flowing into the drain.

12. The main protection valve of claim 1, wherein the main protection valve controller is communicatively coupled to a wireless network and communicates the status of the main protection valve over the wireless network.

13. The main protection valve of claim 1, wherein the main protection valve is communicatively coupled to and controlled by a smart home gateway connected to the Internet.

14. The main protection valve of claim 1, wherein the main protection valve controller is communicatively coupled to a water meter; and
   wherein the first signal to actuate the main protection valve from the run mode to the protection mode is based on a rate of water flow measured by the water meter over a period of time.

15. The main protection valve of claim 1, wherein the main protection valve controller and a user device communicate wirelessly, the user device running an application for changing the main protection valve between the run mode and the protection mode; and
   wherein the first signal to actuate the main protection valve from the run mode to the protection mode is a manual signal transmitted, wirelessly, from the user device in response to the user changing between the run mode and the protection mode using the application.

16. The main protection valve of claim 1, wherein the main protection valve controller is further configured to actuate the main protection valve periodically thereby allowing debris built up inside the main protection valve to escape.

17. The main protection valve of claim 1, wherein the main protection valve controller is further configured to open the water supply inlet incrementally over a period of time.

18. The main protection valve of claim 1 in the protection mode, wherein the main protection valve controller is further configured to send a third signal to a protection valve over a wireless network to open the protection valve and to allow water flow.

19. The main protection valve of claim 1, wherein the main protection valve controller further comprises:
   a central processing unit (CPU) configured to service a communication request to detect a temperature at a location remote from the main protection valve; and
   a communication interface communicatively coupled to the CPU, and configured to send the communication request over a wired or wireless network and to receive the temperature from the remote location over the wired or wireless network; and
   in response to the temperature, the main protection valve actuates between run mode and protection mode.

* * * * *